United States Patent [19]
Takahashi

[11] Patent Number: 5,657,300
[45] Date of Patent: Aug. 12, 1997

[54] MAGNETIC HEAD HAVING ELASTIC MEMBERS FOR MAGNETO-OPTICAL RECORDING DEVICE

[75] Inventor: Tomoyuki Takahashi, Miyagi, Japan

[73] Assignee: Sony Corporation, Tokyo, Japan

[21] Appl. No.: 559,568

[22] Filed: Nov. 16, 1995

[30] Foreign Application Priority Data

Nov. 20, 1994 [JP] Japan ................... 6-310020

[51] Int. Cl.⁶ ............................................... G11B 11/00
[52] U.S. Cl. ................ 369/13; 360/114; 360/102; 360/104
[58] Field of Search .................. 369/13, 14, 75.1, 369/75.2, 77.1, 77.2; 360/114, 102, 103, 104, 105, 59

[56] References Cited

U.S. PATENT DOCUMENTS

| | | | |
|---|---|---|---|
| 4,759,119 | 7/1988 | Noguchi et al. | 29/603 |
| 5,199,090 | 3/1993 | Bell | 385/33 |
| 5,305,294 | 4/1994 | Kime et al. | 369/13 |
| 5,455,809 | 10/1995 | Naraoka et al. | 369/13 |
| 5,467,237 | 11/1995 | Takahashi | 369/13 |
| 5,483,504 | 1/1996 | Horita et al. | 369/13 |

FOREIGN PATENT DOCUMENTS

| | | |
|---|---|---|
| 0 524 629 A1 | 1/1993 | European Pat. Off. . |
| 0566998 A2 | 10/1993 | European Pat. Off. . |
| 0609024 A2 | 8/1994 | European Pat. Off. . |
| 0676745 A1 | 10/1995 | European Pat. Off. . |

OTHER PUBLICATIONS

Patent Abstracts of Japan, P field, vol. 16, No. 231, 28 May 1992 (28 May 1992), p. 21, P1361, JP-4-48-405A (Canon).

*Primary Examiner*—Tan Dinh
*Attorney, Agent, or Firm*—Limbach & Limbach L.L.P.

[57] ABSTRACT

A magnetic head device for magneto-optical recording, employed for magneto-optical disc recording/reproducing apparatus, includes a magnetic head element, a slide contact member carrying the magnetic head element and having a slide contact portion having a sliding contact with a magneto-optical disc and a head support supported for rotation on a stationary portion of a movable base supported for movement radially of the magneto-optical disc via first resilient flexible portions and supporting the slide contact member for rotation at its distal end via second resilient flexible portions. A weight mass is formed integrally with the head support closer to the stationary portion than the first resilient flexible portions.

30 Claims, 16 Drawing Sheets

MAGNETIC HEAD HAVING ELASTIC MEMBERS FOR MAGNETO-OPTICAL RECORDING DEVICE

BACKGROUND OF THE INVENTION

This invention relates to a magnetic head device used in a magneto-optical recording/reproducing apparatus employing a magneto-optical recording medium, such as a magneto-optical disc. More particularly, it relates to a magnetic head device including a magnetic head configured for being slidingly contacted with a magneto-optical recording medium having information signals recorded thereon.

There has hitherto been employed a magneto-optical disc recording/reproducing apparatus employing a magneto-optical disc having a magneto-optical recording layer formed by a perpendicular recording film on a light-transmitting transparent substrate as a recording medium.

With the magneto-optical disc recording/reproducing apparatus, an optical pickup device for radiating a light beam for illuminating the magneto-optical recording layer is arranged facing the magneto-optical disc on one major surface of the magneto-optical disc rotated by a disc rotation mechanism.

With the magneto-optical disc recording/reproducing apparatus, a magnetic field whose direction is modulated in accordance with recording information signals is applied by a magnetic head device on a magneto-optical recording layer of the rotating magneto-optical disc, at the same time as a light beam outgoing from an optical pickup device is radiated on the magneto-optical recording layer. The portion of the magneto-optical recording layer which has lost its coercivity by being illuminated with the light beam and thereby heated to higher than the Curie temperature is magnetized in accordance with the direction of the magnetic field applied by the magnetic head device. The light beam is relatively moved with rotation of the magneto-optical disc so that the above portion is no longer illuminated with the light beam and hence its temperature becomes lower than the Curie temperature. The information signals are recorded by fixation of the direction of magnetization.

With the conventional magneto-optical disc recording/ reproducing apparatus, the magnetic head is caused to face the magneto-optical disc without being contacted therewith during recording of the information signals with a view to prohibiting the magneto-optical disc from becoming damaged by sliding contact with a metal core constituting the magnetic head, such as a ferrite core.

Thus the conventional magnetic head device is provided with an electro-magnetic control mechanism for displacing the magnetic head in following the surface deviations of the magneto-optical disc for holding the magnetic head at a pre-set distance from the magneto-optical disc without being contacted therewith even if surface deviation have been incurred during rotation of the magneto-optical disc due to warping or thickness fluctuations in the disc.

With the magnetic head device provided with the electromagnetic control mechanism for displacing the magnetic head in following surface deviations of the magneto-optical disc for holding the magnetic head at a pre-set distance from the magneto-optical disc, the electro-magnetic control mechanism needs to be driven by an electric power thus increasing the power consumption. In addition, a detection mechanism for detecting the distance between the magnetic head and the magneto-optical disc is required, thus complicating the mechanism for controlling the magnetic head device. In addition, the recording/reproducing apparatus becomes complex in construction thus rendering it extremely difficult to reduce the size and thickness of the apparatus itself.

Thus a magneto-optical disc recording/reproducing apparatus has been proposed which is provided with a magnetic head device adapted for being slidingly contacted with the magneto-optical disc for recording information signals thereon in place of the magnetic head device adapted for controlling the magnetic head so as to be at a distance from magneto-optical disc.

The magnetic head device employed with this type of the magneto-optical disc recording/reproducing apparatus has a slide contact member adapted for having sliding contact with the major surface of the rotating magneto-optical disc and a magnetic head element mounted on the slide contact member and made up of a magnetic core and a bobbin fitted with a coil. The slide contact member thus carrying the magnetic head element is supported by the distal end of a head supporting arm via a resiliently flexible support. If, when the magneto-optical disc is run in rotation, with the slide contact member being in sliding contact with the magneto-optical disc, the disc is subjected to surface deviations, the resiliently flexible support is resiliently flexed so that the slide contact member perpetually maintains its pre-set sliding attitude so as to be in sliding contact with the magneto-optical disc.

The head supporting arm is formed by a resilient spring plate in order to cause the slide contact member carrying the magnetic head element to be contacted with and displaced from the magneto-optical disc and in order to cause the slider to be slidingly contacted with the magneto-optical disc with a pre-set sliding contact pressure. That is, the head supporting arm is rotated by a rotary member provided on the magneto-optical disc recording/reproducing apparatus for causing the slide contact member to be contacted with and displaced from the magneto-optical disc. When the slide contact member is in sliding contact with the magneto-optical disc, the head supporting arm is resiliently displaced for biasing the slide contact member towards the disc.

The support supporting the slide contact member on the distal end of the head supporting arm for resilient displacement has a pair of supporting arms supporting both opposing sides of the slide contact member. The support supports the slide contact member by these supporting arms so that the slide contact member is resiliently deflected so as to be rotated in a direction perpendicular to the direction of resilient deflection of the head supporting arms about the supporting arms as center of rotation. That is, the support having these supporting arms supports the slide contact member so that the slide contact member performs a wobbling deflecting movement on the major surface of the magneto-optical disc. The head supporting arms are designed to have an elastic force sufficiently smaller than the resiliency of the slider supporting arms in order to permit the slider to be deflected in following the surface deviations of the rotated magneto-optical disc.

Each supporting arm constituting the support for the slider has its distal end secured to the head mounting arm and is mounted via the head mounting arm on a mounting base provided within the magneto-optical recording/reproducing apparatus. Thus the slider supporting arm is supported by the head supporting arm in a cantilevered fashion by being fixed at its proximal end about which it may be resiliently deflected in a direction towards and away from the magneto-optical disc.

With the above-described magnetic head device, in which the slide contact member carrying the magnetic head elements is slidingly contacted with the rotated magneto-optical disc for recording information signals, the head supporting arm supporting the slide contact member is formed by the spring plate, in order to permit the slider to be contacted with and displaced from the magneto-optical disc and in order to permit the rotated magneto-optical disc to be in sliding contact with the disc with a pre-set sliding contact pressure.

On the other hand, the head supporting arm affords the slide contact member with a bias force in order to permit the slide contact member to be slidingly contacted with the rotated magneto-optical disc with a pre-set sliding contact pressure. It is sufficient if the force of bias which biases the slide contact member towards the magneto-optical disc is such a force which causes the slide contact member to be slidingly contacted with the magneto-optical disc with a pre-set sliding contact pressure without the slide contact member being floated significantly from the major surface of the rotating magneto-optical disc. If the force of bias which causes the slide contact member to be slidingly contacted with the magneto-optical disc is excessive, the sliding friction between the slide contact member and the magneto-optical disc is increased thus producing significant wear to the slide contact member and the magneto-optical disc. Thus the head supporting arm is formed by a thin spring plate of a rather small resilient force and insufficient mechanical strength. The slide contact member has its proximal end mounted on the head supporting arm so as to be supported in a cantilevered fashion by the head supporting arm.

If an impact is applied to the above-described magnetic head device, there is readily imposed a load in excess of an elastic limit on the head supporting arm which is formed by a thin spring plate of an insufficient mechanical strength and which is supported in a cantilevered fashion, thus readily deforming the head supporting arm. In particular, if an impact is applied to the slide contact member, there is concentrated a load on the proximal end thereof secured to the head mounting arm, thus producing significant deformation of the proximal portion.

This ready deformation on impact application is similarly produced when the magnetic head device is mounted on the magneto-optical recording/reproducing apparatus. That is, if an impact such as that of inadvertent descent is applied to the magneto-optical recording/reproducing apparatus itself, the impact is transmitted to the magnetic head device thus readily deforming the head supporting arm.

With the magnetic head device, it is necessary to provide a jumper for electrically connecting a coil of the magnetic head element mounted on the slider supported by the distal end of the head supporting arm to an external circuit. Thus, with the conventional magnetic head device, an electrically conductive line of a flexible wiring substrate is extended on the head supporting arm so that the coil of the magnetic head element and the external circuit are electrically connected with each other by this jumper. This leads to an increased number of component parts for electrically connecting the coil and the external circuit. In addition, the wiring connection by a solder is necessary thus raising difficulties in connection with production.

OBJECTS AND SUMMARY OF THE INVENTION

It is therefore an object of the present invention to provide a magnetic head device in which a resilient flexible portion for resiliently flexibly supporting a slide contact member carrying a magnetic head element in a direction towards and away from the magneto-optical recording medium is not readily deformed for assuring sufficient durability of the magnetic head device.

It is another object of the present invention to provide a magnetic head device in which the resilient flexible portion supporting the slide contact member slidingly contacted with the magneto-optical recording medium may be fabricated from a thin spring plate having insufficient mechanical strength for prohibiting excessive wear to the slide contact member and the magneto-optical recording medium for protecting the slide contact member and the magneto-optical recording medium.

It is a further object of the present invention to provide a magnetic head device in which it is possible to simplify the structure for establishing and releasing contact of the slide contact member with the magneto-optical recording medium.

It is yet another object of the present invention to provide a magnetic head device in which the operation of electrically connecting the coil of the magnetic head element mounted on a slide contact member supported on the distal end of the supporting arm to the external circuit and the assembling operation may be facilitated to render it possible to reduce the number of components.

The magnetic head device for magneto-optical recording according to the present invention, employed for a magneto-optical disc recording/reproducing apparatus, includes a magnetic head element, a slide contact member carrying the magnetic head element and having a slide contact portion having sliding contact with a magneto-optical disc, and a head support which is supported for rotation on a stationary portion of a movable base supported for movement radially of the magneto-optical disc via first resilient flexible portions and which supports the slide contact member for rotation at its distal end via second resilient flexible portions. A weight mass is formed integrally with the head support closer to the stationary portion than the first resilient flexible portions.

Since the weight mass is provided integrally with the head support at a position closer to the stationary portion than the first resilient flexible portions towards the stationary portion of the head support supporting the slide contact member carrying the magnetic head element at the distal end, the first resilient flexible portions are positioned in the vicinity of the center of gravity of the head support and the weight mass combined together. If an impact is applied to the magnetic head device, the inertial moment on the side of the head support and that of the weight mass is in equilibrium with the vicinity of the first resilient flexible portions as a center for restricting significant deflection of the head support.

More specifically, with the magnetic head device according to the present invention, since the head support carrying the slide contact member is extended via the second resilient flexible members on one side of the first resilient flexible portions, and the weight mass integral with the head support is extended on the opposite side of the first resilient flexible portions, the point of rotational deviation of the head support and the weight mass combined together can be positioned at or in the vicinity of the center of gravity. Since the point of rotational deflection of the head support and the weight mass combined together can be positioned at the position of the center of gravity or in its vicinity, the inertial moment on the side of the head support about the first resilient flexible portions as a center is in equilibrium with that on the side of the weight mass, with the vicinity of the first resilient flexible portions as the center, if an impact is applied to the magnetic head device, so that significant deflection of the first resilient flexible portions is inhibited.

Thus, if an impact is applied, the first resilient flexible portions, supporting the slide contact member carrying the magnetic head element for resilient deflection in a direction towards and away from the magneto-optical recording medium, are not likely to be deformed, thus assuring sufficient durability of the magnetic head device. Since the first resilient flexible portions supporting the head support for resilient deflection and adapted for affording a force of bias of biasing the slide contact member supported by the end of the head support towards the magneto-optical recording medium is protected in this manner, it becomes possible to fabricate the elastic members making up the resilient flexible portions by a thin spring plate of insufficient mechanical strength exhibiting the force of elasticity capable of generating a required minimum slide contact pressure sufficient to cause the-slide contact member to have a sliding contact with the rotated magneto-optical recording medium. By reducing the relative slide contact between the slide contact pressure and the magneto-optical recording medium, it becomes possible to prevent the slide contact member and the magneto-optical recording medium from becoming worn out significantly.

Since the weight mass extended from the head support is integrally formed with a rotating portion adapted for rotating the head support about the first resilient flexible portions as the center of rotation, the mechanism of bringing the head support carrying the slide contact member in turn carrying the magnetic head element into and out of contact with the magneto-optical recording medium may be simplified in structure.

Since there is provided the controlling device for restricting the amount of rotation of the rotating portion integrally formed with the weight mass when the rotating portion is rotated for turning the head support upwards into a position facing the slide contact surface of the slide contact member for the magneto-optical disc, excess rotation of the head support is inhibited thus assuring protection of the first resilient flexible portions rotatably supporting the head support for assuring improved durability of the magnetic head device.

Since there is provided a rotational position control arm abutted against a portion of the slide contact member for controlling the rotational position of the slide contact member when the rotating portion is rotated and the head support is turned upwards to a position of facing the slide contact surface for the magneto-optical disc of the slide contact member supported on the distal end of the head support via the second resilient flexible portions, with the first resilient flexible portions as the center, the rotational position of the slide contact member supported via the second resilient flexible portions on the distal ends of the head support may be controlled to be parallel to the head support thus producing a large space between the head support and the magneto-optical disc.

In addition, since the stationary portion supporting the head support via the first resilient flexible portions is provided with an external circuit connecting portion for connection to an external circuit produced by partially exposing portions of the elastic member electrically connected to the coil of the magnetic head element mounted on the slide contact member in turn supported on the distal end of the head support, an electrical connection can be established between the external circuit and the magnetic head via the resilient member. Thus the conductors employed for electrical connection may be eliminated for facilitating the electrical connecting operation. In addition, the magnetic head device may be assembled easily while the number of component parts may be reduced.

DETAILED DESCRIPTION OF THE PREFERRED EMBODIMENTS

Figure 1:
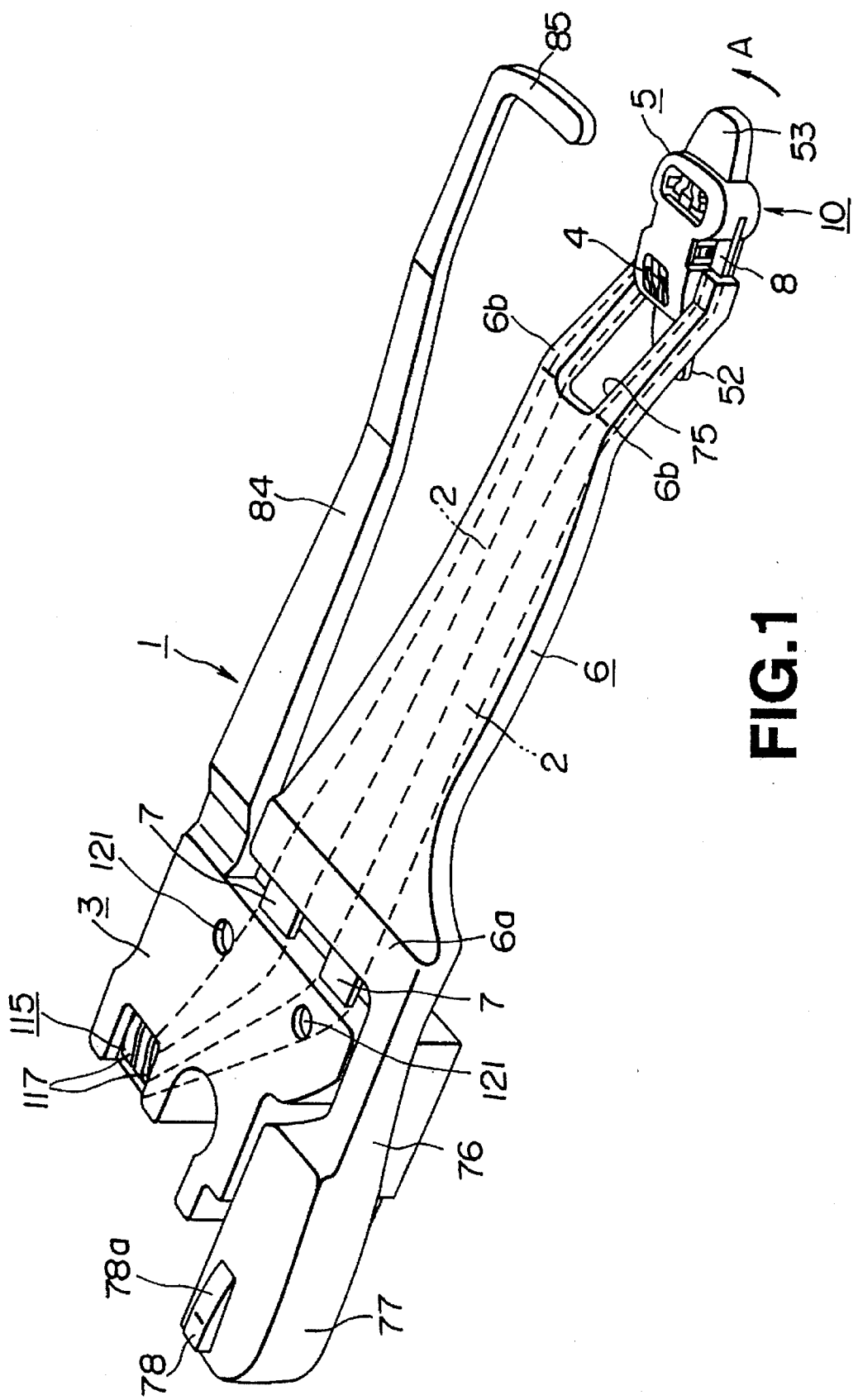
FIG. 1 is a perspective view showing the upper surface of a magnetic head device according to the present invention.

Referring to the drawings, preferred embodiments of the present invention will be explained in detail.

Figure 2:
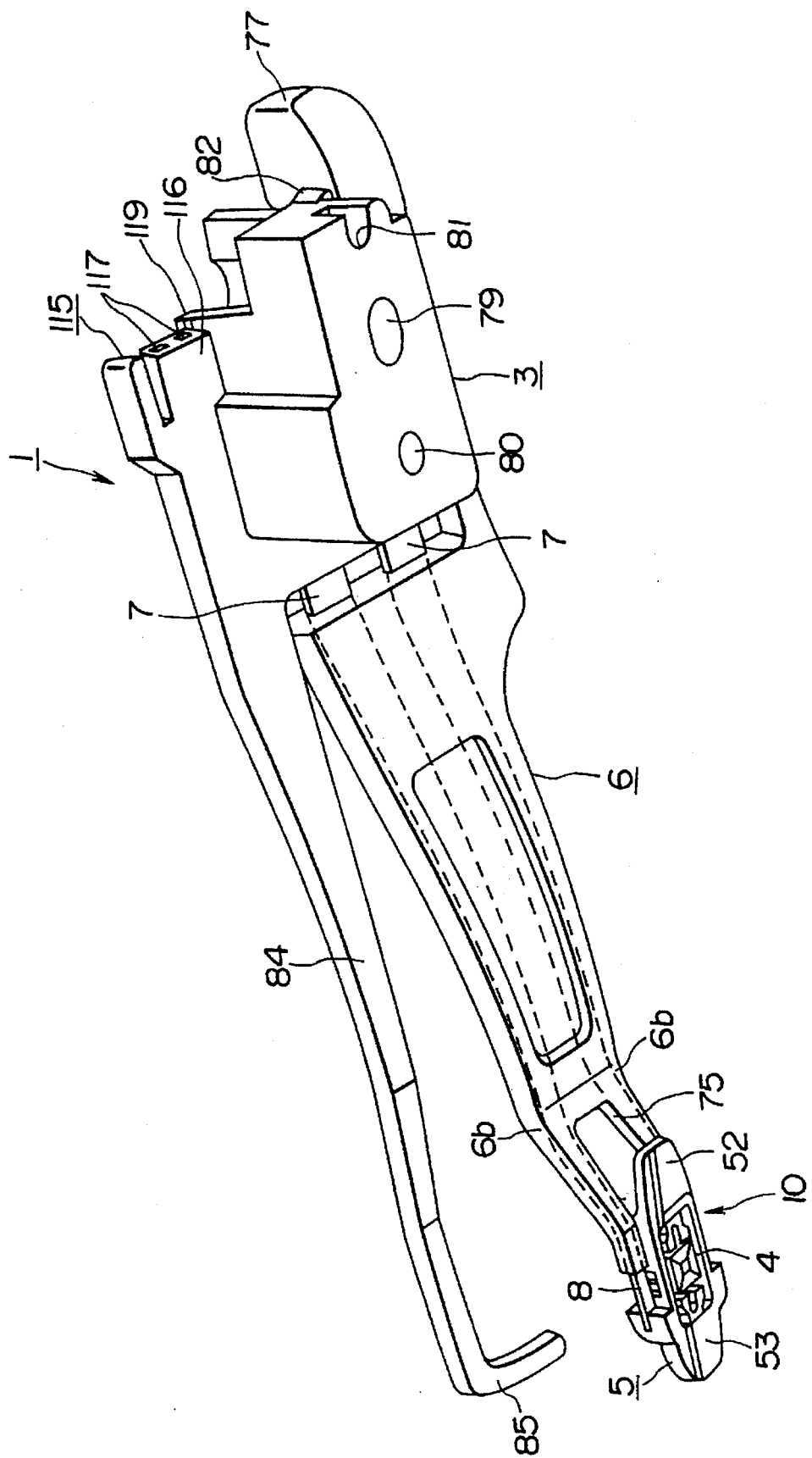
FIG. 2 is a perspective view of the magnetic head device according to the present invention looking from the side of the sliding contact surface with respect to the optical recording medium.

The magnetic head device according to the present invention includes a pair of elongated elastic members 2, 2 arranged substantially parallel to each other, as shown in FIGS. 1 and 2. These elastic members 2, 2 are formed by punching thin plates of metal, such as phosphor bronze or BeCu exhibiting electrical conductivity. Above all, the elastic members are formed of age-hardening materials, such as BeCu, whose hardening degree is changed with the duration of heat treatment. Since the elastic members 2, 2 are formed of the age-hardening materials, the elastic force of the elastic members 2, 2 may be easily set to a desired value.

The distal ends of these elastic members 2, 2 are provided with feed terminals electrically connected to the coils of the magnetic head element mounted on slide contact member as later explained. On the other hand, the proximal ends of the elastic members 2, 2 are provided with terminals constituting an external circuit connecting portion connected to an external connection cable configured for feeding the coil of the magnetic head element as later explained.

The proximal ends of the elastic members 2, 2 are integrally molded with a stationary portion 3 by molding a synthetic reason material, as shown in FIGS. 1 to 4. The stationary portion 3 is used for mounting the magnetic head device 1 within the magneto-optical recording/reproducing apparatus. The distal ends of the elastic members 2, 2 are integrally formed with a slide contact member 5 by molding a synthetic resin material. The slide contact member 5 has mounted thereon a magnetic head element 4 made up of a magnetic core and a coil for constituting a magnetic head 10. Between the proximal ends of the elastic members 2, 2 provided with the stationary portion 3 and the distal ends thereof provided with the slide contact member 5, a head support 6 is integrally molded with the elastic members 2, 2 by molding the synthetic resin material.

The head support 6, molded from the synthetic resin material, is integrally provided partway on the elastic members 2, 2 so that the elastic members 2, 2 are partially exposed to outside between the head support and the stationary portion 3 and so that the elastic members 2, 2 are partially exposed to the outside between the head support and the slider 5. The portions of the elastic members 2, 2 exposed to the outside between the head support 6 and the stationary portions 3, operate as first resilient flexible portions 7, 7 acting as the center of rotation when the head support 6 inclusive of the slide contact member 5 is moved in a direction towards and away from the magneto-optical disc. The portions of the elastic members 2, 2 exposed to the outside between the head support 6 and the stationary portion 3 operate as second resilient flexible portions 8, 8 resiliently deflected for permitting wobbling deflections of the slide contact member 5 carrying the magnetic head element 4 in following surface deviations of the magneto-optical disc.

The portions of the elastic members 2, 2 constituting the second flexible portions 8, 8 are narrower in width than the portions thereof constituting the first resilient flexible portions 7, 7 so as to be resiliently flexed readily under lighter load than with the first resilient flexible portions 7, 7. That is, since the first resilient flexible portions 7, 7 bias the head support so that the slider 5 will be slidingly contacted with the rotated magneto-optical disc with a pre-set sliding contact pressure, it is necessary for the first resilient flexible portions 7, 7 to afford to the head support 6 a force of bias sufficient to prohibit the slide contact member 5 from being floated from the magneto-optical disc even in case the rotated magneto-optical disc is subjected to surface deviations. On the other hand, the second resilient flexible members 8, 8 perform the role of following rotation of the magneto-optical disc for maintaining a constant pre-set sliding contact attitude of the slide contact member 5 even in case the magneto-optical disc is subjected to surface deviations with the slide contact member 5 remaining slidingly contacted with the magneto-optical disc. Thus the spring force of the second resilient flexible members 8, 8 is selected to be smaller than that of the first resilient flexible portions 7, 7.

Specifically, the slide contact member 5, integrally formed on the distal ends of the elastic members 2, 2 constitutes a magnetic head 10 by having mounted thereon a magnetic head element 4 having a magnetic core and a bobbin having a coil. When the magnetic head device 1 is mounted on the magneto-optical recording/reproducing apparatus for recording information signals on the magneto-optical disc, the slide contact member 5 is slidingly contacted with one of the major surfaces of the rotated magneto-optical disc for maintaining a pre-set distance between the magnetic head element 4 and the signal recording layer of the magneto-optical disc.

Figure 5:
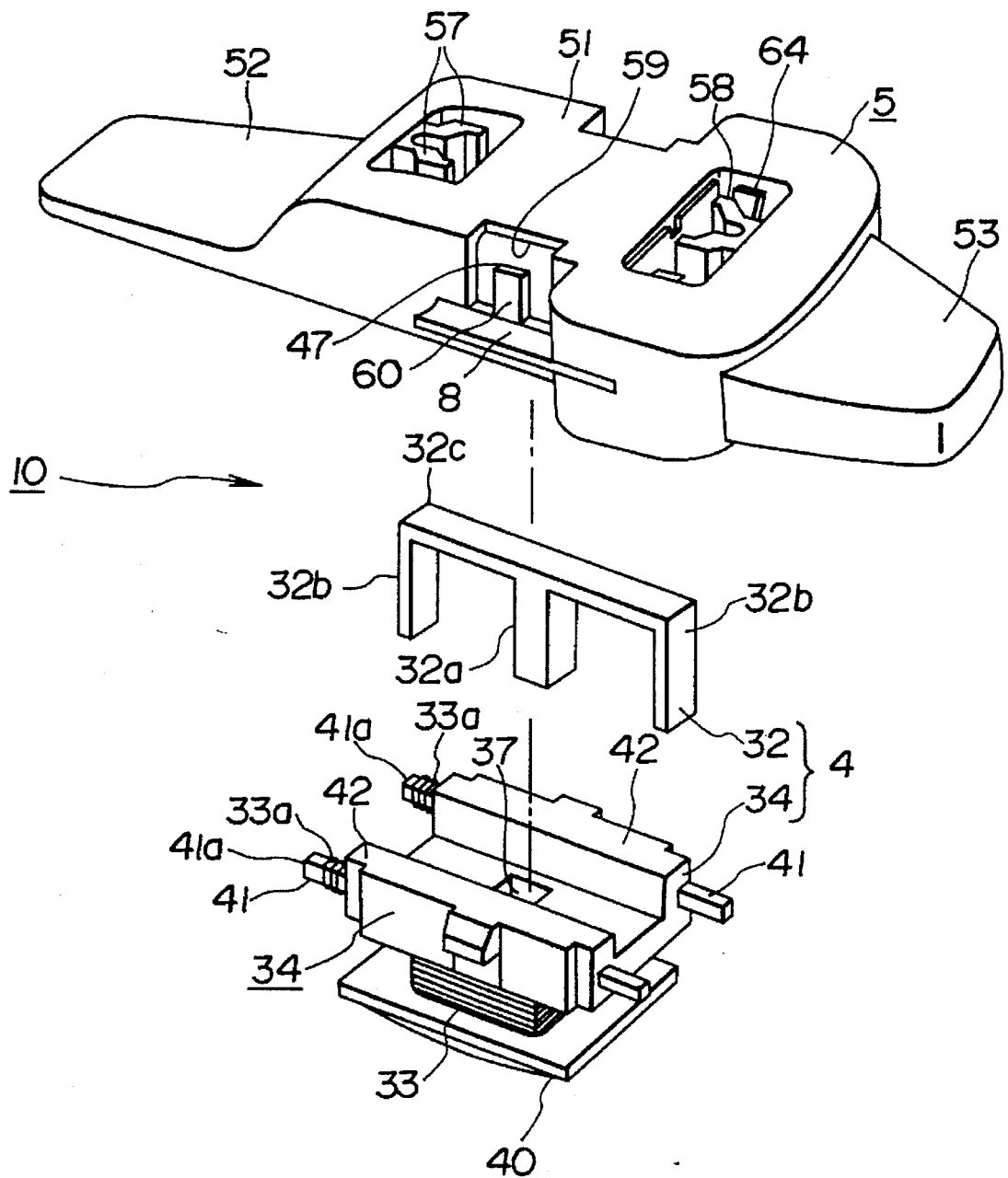
FIG. 5 is an exploded perfective view of the magnetic head constituting the magnetic head device according to the present invention.

The magnetic head element 4 constituting the magnetic head 10 by being mounted on the slide contact member 5 is made up of a magnetic core 32 formed of a magnetic material such as ferrite and a bobbin 34 about which the coil 33 is wound, as shown in FIG. 5. The magnetic core 32 has a center magnetic core 32a, a pair of side magnetic cores 32a, 32b provided on both sides of the center magnetic core 32a and a connecting portion 32c interconnecting the proximal ends of the magnetic cores 32a, 32b, 32b, and has substantially the shape of a letter E. The center magnetic core 32a is longer in length than the side magnetic cores 32b, 32b so that the distal end of the center magnetic core is slightly protruded beyond the distal ends of the side magnetic cores 32b, 32b.

Figure 6:
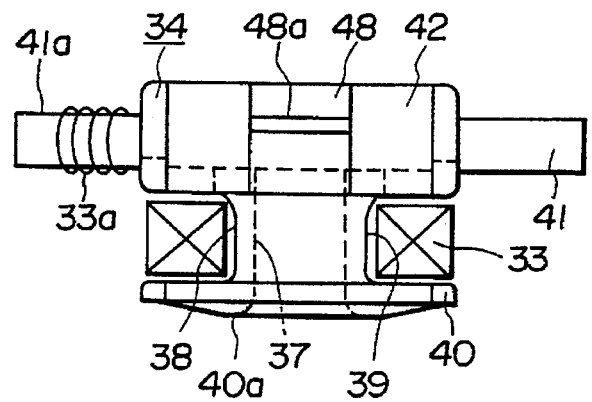
FIG. 6 is a side view of a bobbin constituting a magnetic head element.
Figure 7:
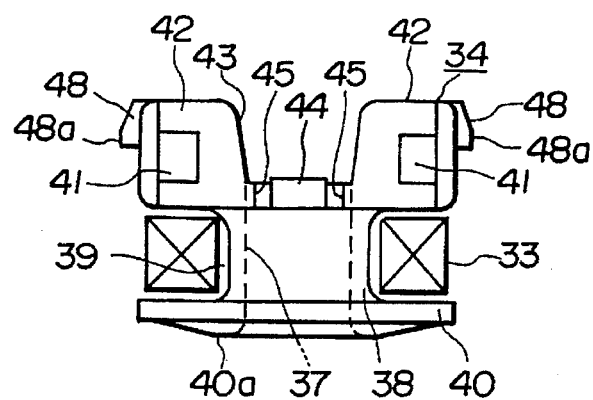
FIG. 7 is a right-hand side view of the bobbin shown in FIG. 6.

The bobbin 34 is molded from a synthetic resin material which permits molding to an extremely high degree of precision, such as liquid crystal polymer or polyphenylene sulfide. The bobbin 34 has a main bobbin member 38 having a center opening 37 for accommodating the center magnetic core 32a of the magnetic core 32, as shown in FIGS. 5 to 8. The outer periphery of the main body member 38 has a recessed coil winding portion 39 on both sides of the center opening 37. One end of the main bobbin member 38 is integrally formed with a flange 40 protruded in a direction perpendicular to the axis of the inserting opening 37. The flange 40 has its end face 40a as slide contact surface for the magneto-optical disc. Thus the end face 40a of the flange 40 has a curved surface protuberant at the center portion so as to be in smooth sliding contact with the magneto-optical disc when the end face 40a is abutted against the major surface of the disc, as shown in FIGS. 6 and 7.

Figure 8:
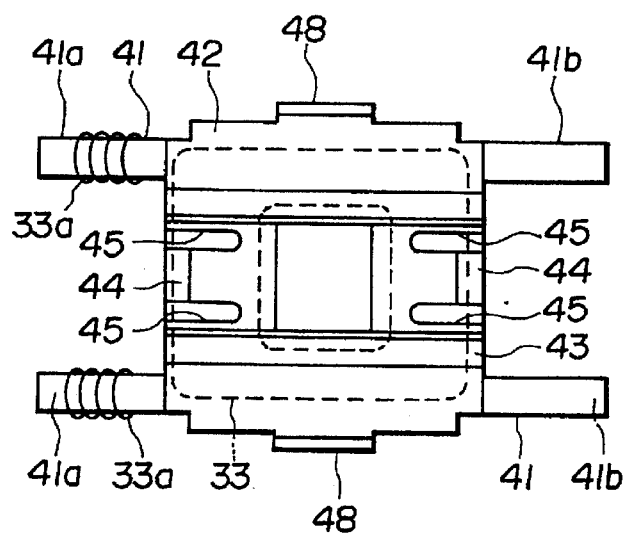
FIG. 8 is a bottom plan view of the bobbin shown in FIG. 6.

The opposite side of the main bobbin member 38 has a pair of supports 42, 42 supporting a pair of coil connection terminals 41, 41 formed of an electrically conductive material, such as phosphor bronze, as shown in FIGS. 7 and 8. These supports 42, 42 are protruded parallel to each other in a direction perpendicular to the axis of the inserting opening 37. A pair of coil connection terminals 41, 41 are integrally formed with the supports 42, 42 and are protruded at distal ends thereof beyond the supports 42, 42.

The coil connection terminals 41, 41 are arranged within a metal mold during molding of the bobbin 34 in a metal mold device so as to be molded simultaneously and integrally with the supports 42, 42, and are mounted on the supports 42, 42 by so-called insert molding.

The connection terminal 33a of the coil 33 placed around the coil winding portion 39 of the bobbin 34 is wound several turns on coil connection portions 41a of the coil connection terminals 41, 41 for electrical connection with the connection terminals, as shown in FIG. 8. For assuring positive electrical connection with the connection terminals 33a of the coil 33 and with the coil connecting portions 41a, the connection terminals 33a is connected to the coil connecting portions 41a using an electrically conductive adhesive or a solder.

The supporting portions 42, 42 formed on the opposite side of the main bobbin member 38 define a recess performing the role of a fitting portion 43 for the magnetic core 32. The core supports 44, 44 are formed on each lateral side thereof with a pair of slots 45, 45 as shown in FIGS. 7 and 8 so that the core supporting portions are resiliently flexed at the distal ends thereof with the connecting portions thereof to the main bobbin member 38 as center. That is, when a magnetic core 32 not machined with sufficient precision is mounted on the bobbin 34, the core supporting portions 44, 44 are thrust against by the connecting portions 32c of the magnetic core 32 for being resiliently flexed for controlling the inserting direction of the center magnetic core 32a in order to permit the center magnetic core 32a to be positively introduced into the inserting opening 37.

The upper ends of the supports 42, 42 are formed with engagement pawls 48, 48 which, when the bobbin 34 is mounted by being fitted in a mounting opening 46 of the magnetic head element 4 provided on the slide contact member 5, are engaged with an engagement step 47 provided as a mating engagement portion. These engagement pawls 48, 48 are formed for extending parallel to the axis of the inserting opening 37 formed in the bobbin 34 and are formed with terminal pawls 48a, 48a, as shown in FIGS. 6 and 7. These pawls 48a, 48a are angled acutely so as to be tapered at distal ends thereof.

The slide contact member 5, carrying the magnetic core 32 and the bobbin 34 making up the magnetic head element 4, is molded from a synthetic resin material, such as electrically non-conductive polyester, as shown in FIGS. 5 and 9 to 11, and has a mounting portion 51 for the magnetic head element 4 at its mid portion. A slide contact portion 52 adapted for having a sliding contact with the major surface of the magneto-optical disc is protrudingly formed beginning at an end portion of the mounting portion 51. The distal end of the slide contact member 5 opposite to its proximal end formed with the slide contact portion 51 is formed with an abutment portion 53 which, when the sliding contact member 5 is turned in a direction away from the magneto-optical disc along with the head support 6 as will be explained subsequently, is abutted against the rotation position control arm for controlling the rotational position of the slide contact member 5 which performs rotation about the second resilient flexible portions 8, 8 as the center of rotation.

Figure 9:
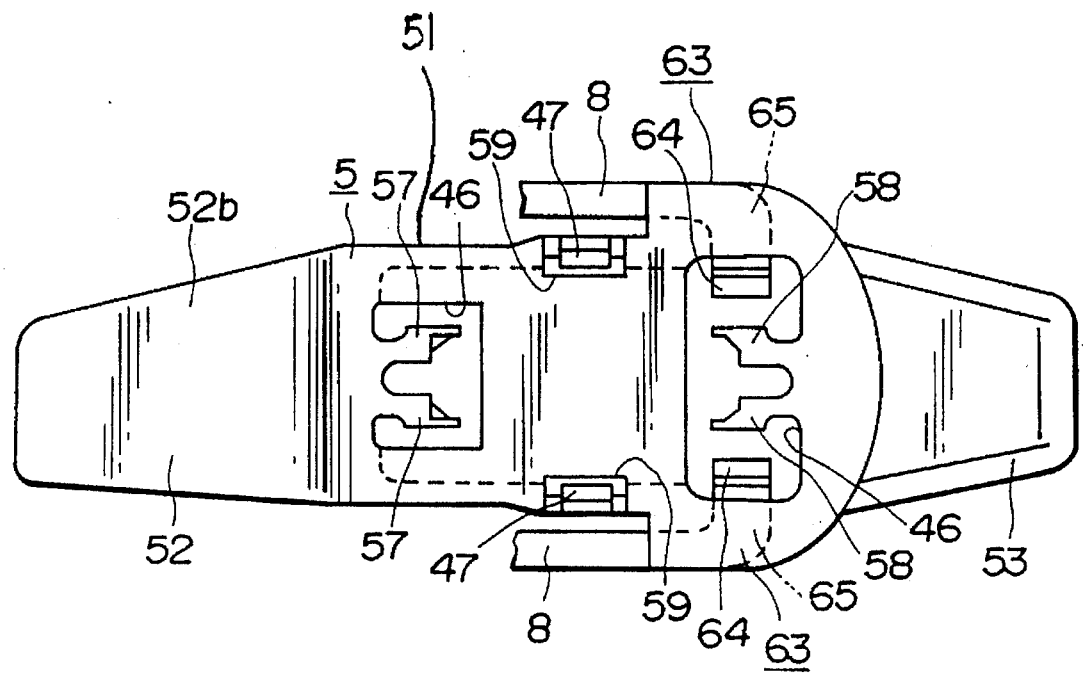
FIG. 9 is a plan view of a slide contact member.
Figure 10:
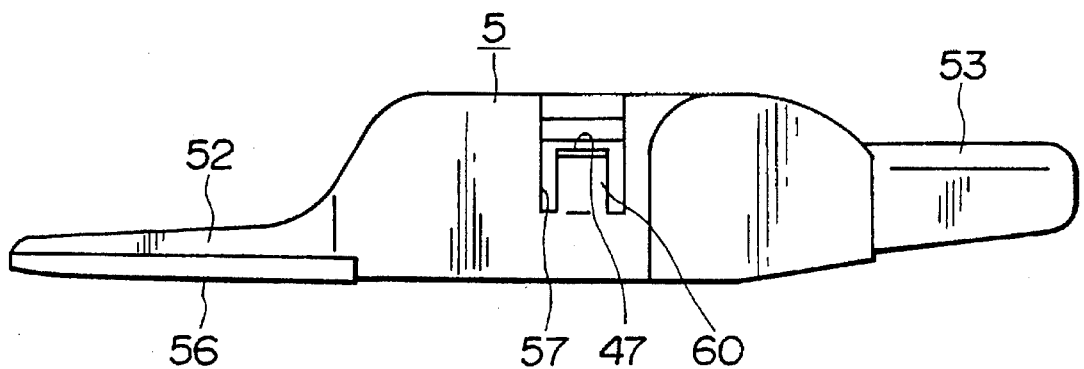
FIG. 10 is a side view of the slide contact member shown in FIG. 9.
Figure 11:
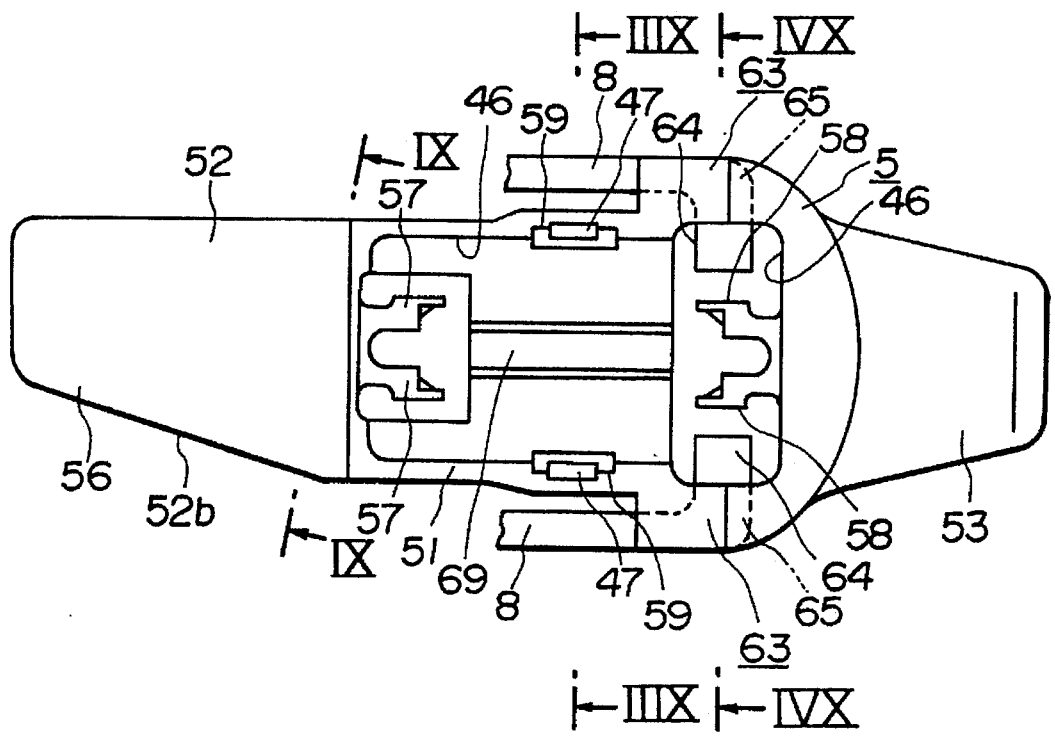
FIG. 11 is a bottom plan view of the slide contact member shown in FIG. 9.
Figure 12:
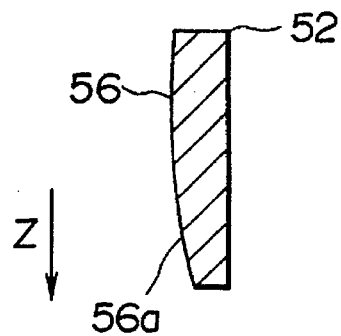
FIG. 12 is a cross-sectional view taken along line IX—IX of FIG. 11.

The slide contact portion 52 is positioned towards the opening end of the mounting opening 46 formed in the mounting portion 51 and is protruded from one end of the mounting portion 51 as shown in FIG. 9. A sliding surface 56, having a sliding contact with the major surface of the magneto-optical disc, is shown in FIG. 12 which shows a cross-section taken along line IX—IX in FIG. 11. The slide contact surface 56 has an inclined surface 56a on its side extending along the direction of relative movement of the magnetic head 10 on the magneto-optical disc (on the side shown by arrow Z in FIG. 12) when the magnetic head 10 is in sliding contact with the magneto-optical disc. By providing the inclined surface 56a, a smooth sliding contact of the slide contact surface 56 with the rotating magneto-optical disc is assured. The sliding contact portion 52 is formed for being slightly protruded from the surface of the mounting portion 51 facing the major surface of the magneto-optical disc for assuring positive sliding contact thereof with the major surface of the magneto-optical disc, as shown in FIG. 10.

The mounting portion 51 provided on the sliding contact member 5 has a mounting aperture 46 for fittingly mounting the magnetic core 32 and the bobbin 34 to each other. The mounting opening 46 is formed as a bottomed recess opened at on its surface slidingly contacted with the magneto-optical disc. The mounting aperture 46 is formed on the sides thereof opposing to each other in the longitudinal direction thereof with first and second clamping pieces 57, 57 and 58, 58 for clamping the side magnetic cores 32b, 32b formed on both sides of the magnetic core 32 inserted into the mounting aperture 46, as shown in FIGS. 9 and 11. The clamping pieces 57, 57 and 58, 58 are protuberantly formed for extending towards each other from the sides thereof opposing to each other along the length of the mounting aperture 46. The distance between the clamping pieces 57, 57 and 58, 58 is selected to be slightly smaller than the thickness of the magnetic core 32 for clamping the side magnetic cores 32b, 32b of the magnetic core 32 fitted onto these clamping pieces 57, 58, 58 under pressure.

Figure 13:
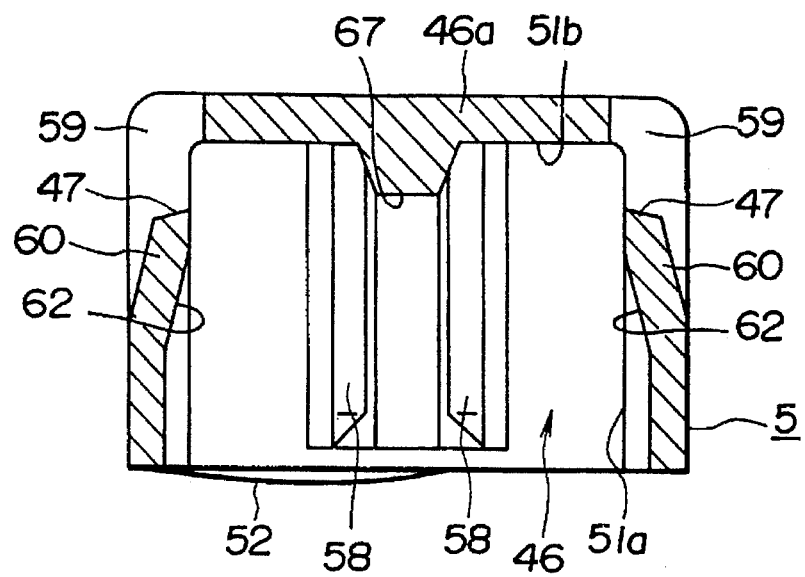
FIG. 13 is a cross-sectional view taken along line IIIX—IIIX of FIG. 11.

On the sides of the mounting aperture 48 extending perpendicular to the sides thereof formed with the first and second clamping pieces 57, 57, 58, 58, there are formed engagement shoulders 47, 47 engaged by the engagement pawls 48a, 48a of engagement pawls 48, 48 formed on the bobbin 34 fitted into the mounting aperture 46, as shown in FIGS. 9 and 13. These engagement shoulders 47, 47 are formed on upper end faces of resilient flexible pieces 80, 80 formed by boring U-shaped cut-outs 59, 59 in the longitudinally opposing sides of the mounting aperture 46 for extending from the upper surface as far as a mid portion of the slide contact member 5 corresponding to the surface 46a of the mounting aperture 46, as shown in FIG. 13. That is, the engagement shoulders 47, 47 are formed by the cut-outs 59, 59 formed in the longitudinally opposing sides of the mounting aperture 46 and constitute portions of these cut-outs 59, 59. The surfaces of the engagement shoulders 47, 47 formed by portions of the cut-outs 59, 59 engaged with the engagement pawls 48a, 48a are formed as acute pointed surfaces for mating with the engagement pawls 48a, 48a.

The upper ends of the resilient flexible pieces 60, 60 provided with the engagement shoulders 47, 47 in turn formed by forming the cut-outs 59, 59 are inclined towards the inner side of the mounting aperture 48 for defining the engagement shoulders 47, 47, as shown in FIG. 13. The surfaces of the resilient flexible pieces 60, 60, inclined towards each other, are abutted against portions of the outer periphery of the bobbin 34 inserted into the mounting aperture 46, thus operating as inserting guide portions 62, 62 configured for guiding the bobbin 34 as to inserting direction and position.

Within the mounting aperture 46, the pair of electrically conductive resilient members 2, 2 are bent at their distal ends for protuberantly forming a pair of feed terminals 63, 63. These feed terminals 63, 63 are electrically contacted with connection terminals 41b, 41b of the coil connection terminals 41, 41 provided within the bobbin 34 inserted into the mounting aperture 46 for feeding the current to the coil 33 placed around the bobbin 34. Thus the feed terminals are provided at the positions contactable with the connection terminals 41b, 41b of the coil connection terminals 41, 41 mounted on the bobbin 34 when the bobbin 34 is mounted within the mounting aperture 46. The feed terminals 63, 63 are protuberantly formed on the opposing lateral sides of the mounting aperture 46, as shown in FIGS. 9 and 11.

Figure 14:
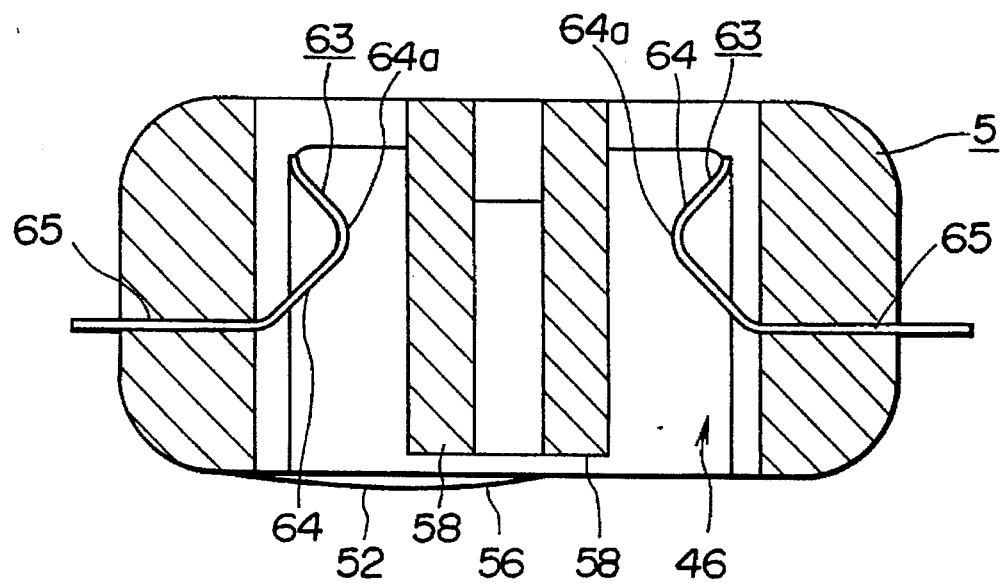
FIG. 14 is a cross-sectional view taken along line IVX—IVX of FIG. 11.
Figure 16:
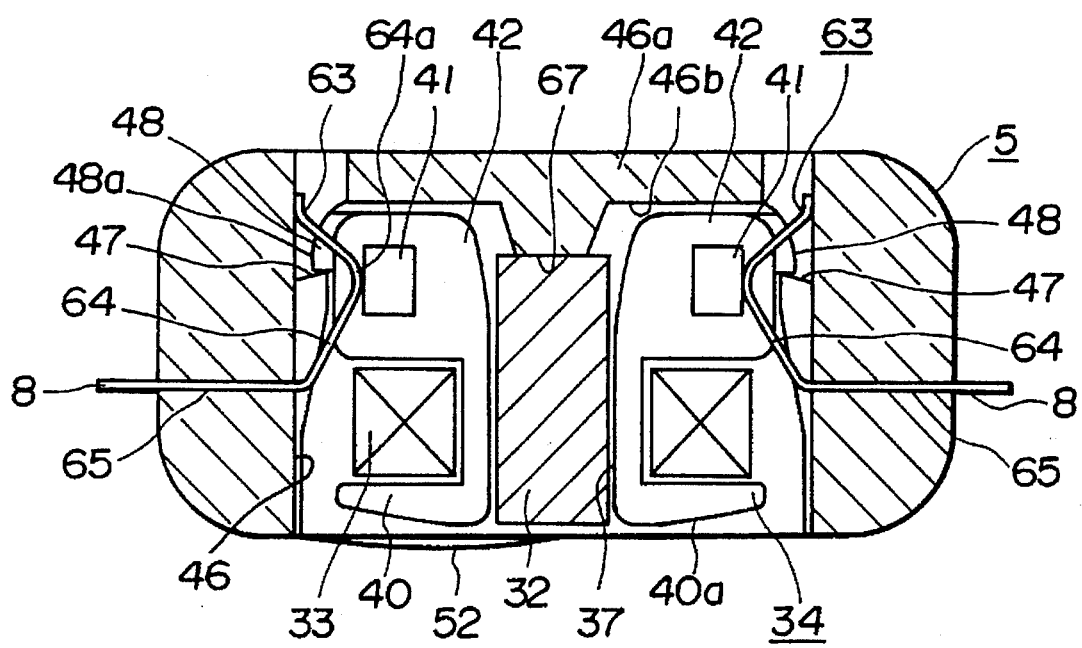
FIG. 16 is a cross-sectional view showing the state in which the magnetic head element is mounted on the slide contact member.

Each feed terminal 83, formed by bending the distal ends of the elastic members 2, 2, has a bent portion 84 protruded into the mounting aperture 46 for being resiliently contacted with the coil connection terminals 41, 41, and a mounting portion 85 molded with the slide contact member 5 from synthetic resin, as shown in FIGS. 14 and 16. The bent portion 64 of the feed terminal 63 is bent at its mid portion so that the resulting protruded portion operates as an electorial contact portion with the coil connection terminals 41. This bent portion 64 is bent from an end of the mounting portion 85 in a direction of insertion of the bobbin 64 into the mounting aperture The mounting portions 85, 85 of the feed terminals 63, 63 are protruded laterally of the position of the center of gravity of the slide contact member 5 in continuation to the second resilient potions 8, 8. Thus the slide contact member 5 has its portion near the center of gravity thereof supported by the elastic members 2, 2.

The bent portion 64 of each feed terminal 63 contacted with the coil connection terminals 41, 41 is plated with gold, nickel or solder for reducing the electrical resistance on contact with the coil connection terminal. The material used for plating is preferably a material having an electrical resistance lower than that of the feed terminal 63 for diminishing the electrical resistance during electrical contact.

Similarly, the connection terminals 41b, 41b contacted with the bent portions 64, 64 of the coil connection terminals 41, 41 are also preferably plated with gold, nickel or solder for similarly reducing the electrical resistance during electrical contact.

On the surface 46a of the mounting aperture 46, that is the inner surface of the top plate of the slide contact member 5, there is formed a magnetic core abutment 67 for controlling the mounting position of the magnetic core 32 relative to the mounting aperture 46 by abutment on the end face of the center magnetic core 32a of the magnetic core 32 mounted within the mounting aperture 46.

The process for assembling the above-described magnetic head 10 as well as the assembled magnetic head is now explained.

Figure 15:
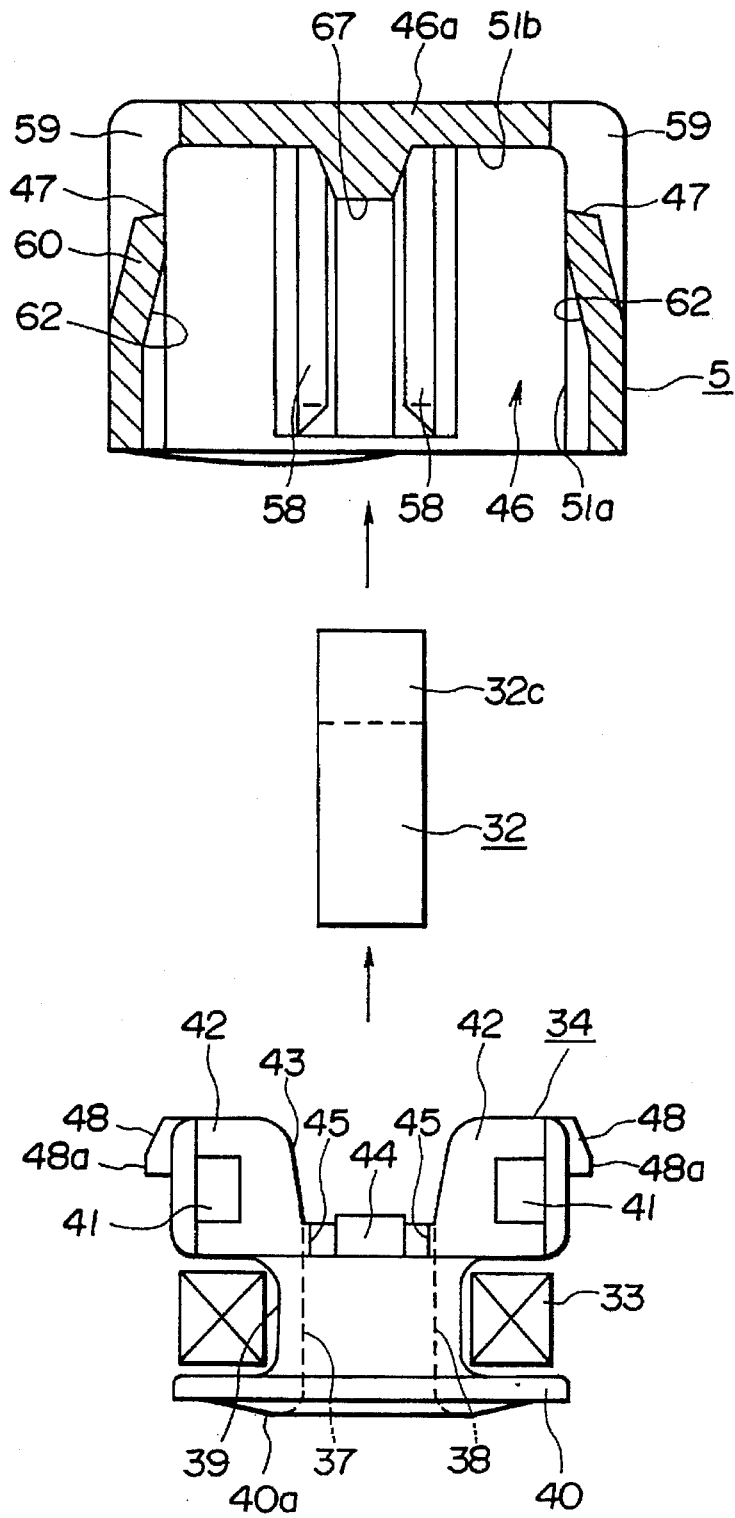
FIG. 15 is a cross-sectional view showing the assembled state of the magnetic head.

For assembling the magnetic head 10, the magnetic head 32 is assembled within the mounting aperture 46 formed in the slide contact member 5. The magnetic core 32 is inserted into the mounting aperture 46 from the opening end of the slide contact member 5 opening on the slide contact surface of the magneto-optical disc, with the connection portion 32c first, as shown in FIG. 15. The magnetic core 32, inserted into the mounting aperture 46, has both lateral sides of the side magnetic cores 32b, 32b fitted in a space between the first and second clamping pieces 57, 57, 58, 58 so as to be provisionally secured within the mounting aperture 46 by these clamping pieces 57, 58. The magnetic core 32 has the upper surface of the connecting portion 32c abutted against a core abutting portion 67 so as to be position-controlled as to the direction of insertion into the mounting aperture 46.

The bobbin 34, about which the coil 33 is placed, is inserted into the mounting aperture 46 within which has been placed the magnetic core 32. The bobbin 34 is inserted via the opening end 51a into the mounting aperture 46 so that the sides thereof formed with the engagement pawls 48, 48 are associated with the sides of the mounting aperture 46 formed with the engagement shoulders 47, 47 and so that the connection terminals 41b, 41b of the coil connection terminals 41, 41 are associated with the feed terminals 63, 63 protuberantly formed within the mounting aperture 46. At this time, the center magnetic core 32a of the magnetic core 32 is inserted into the inserting opening 37 in the bobbin 34. As the bobbin 34 is further inserted into the mounting aperture 46, the bobbin 34 is introduced into the inside of the mounting aperture 46 with the outer sides thereof carrying the coil connection terminals 41, 41 being slidingly contacted with the insertion guides 62, 62 formed on facing sides of the resilient flexible pieces 60, 60 protruded into the mounting aperture 46. The bobbin 34 is controlled as to the direction of insertion thereof into the mounting aperture 46 by the bobbin 34 being introduced into the mounting aperture 46 by having the outer lateral sides thereof guided by the insertion guides 62, 62. Thus the bobbin 34 is intruded into the mounting aperture 46 with the center magnetic core 32a of the magnetic core 32 provisionally secured within the mounting aperture 46 being correctly inserted into the inserting opening As the bobbin 34 is inserted into the mounting aperture the resilient flexible pieces 60, 60 are resiliently flexed outwardly of the mounting aperture 46 by the engagement pawls 48. When bobbin 34 is inserted until the inserting end thereof is abutted against the bottom surface 51b of the mounting aperture 46, the engagement pawls 48a, 48a at the distal ends of the engagement pawls 48, 48 reach the engagement shoulders 47 47 formed at the distal ends of the resilient flexible pieces 60, 80 for realizing relative engagement between the engagement pawls 48a, 48a and the engagement shoulders 47, 47 by resilient restoration of the resilient flexible pieces 60, 60, as shown in FIG. 16. The bobbin 34 is mounted in position within the mounting aperture 46, with the protuberant center flange 40 on the end face 40a facing the surface of the slide contact member 5 facing the magneto-optical disc, as shown in FIG. 16.

When the bobbin 34 is mounted within the mounting aperture 46, the connection terminals 41b of the coil connection terminals 41, 41 are caused to bear on the feed terminals 63, 63 protruded into the mounting aperture 46 for establishing electrical connection. Since the bent portions 64, 64 of the feed terminals 63, 63, protruded into the resilient mounting aperture 46, are contacted with the connection terminals 41b, 41b, these feed terminals 63, 63 are abutted against the connection terminals 41b, 41b with a resilient bias thus assuring positive electrical connection.

Since the feed terminals 63, 63 are formed with mid bent portions 64, 64 and hence are chevron-shaped, the distal ends of the feed terminals 63, 63 are caused to bear on the connection terminals 41b, 41b when contacted with the connection terminals 41b, 41b thus affording a significant resilient force to the connection terminals 41b.

The magnetic head 10, assembled as described above, may be assembled by simply sequentially inserting the bobbin 34 fitted with the coil 33 and the magnetic core 32, so that there is no necessity of employing an adhesive for securing the magnetic core 32 and the coil 33 on the slide contact member 5. Thus significantly facilitates the assembling operation. The mounting position of the magnetic head element 4 with respect to the slide contact member 5 may be determined by the position of relative engagement between the engagement pawls 48a, 48a and the engagement shoulders 47, 47, thus enabling the mounting position to be set easily and accurately.

There is also no necessity of providing a solder for interconnecting the feed terminals 63, 63 and the coil connection terminals 41, 41 provided on the bobbin 34, thus simplifying the assembling operation of the magnetic head 10.

Figure 3:
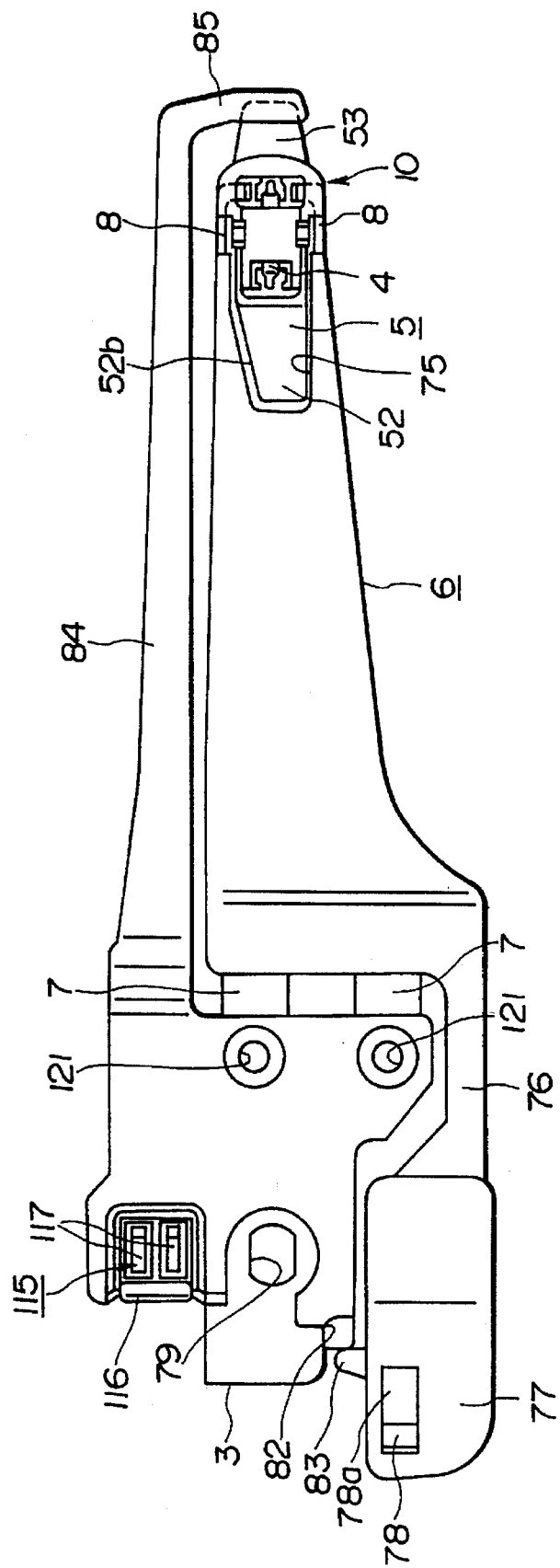
FIG. 3 is a plan view showing the magnetic head device shown in FIG. 1.

Referring again to FIGS. 1, 2 and 3, the head support 6, carrying the above-described magnetic head 10 on its distal end by the second resilient pieces 8, 8, is fabricated by molding from a synthetic resin material for extending across the elastic members 2, 2 and setting the relative position of the elastic members 2, 2, while affording toughness to these elastic members 2, 2. The head support 6 supports the slide contact member 5 constituting the magnetic head 10 mounted at the distal end of the elastic members 2, 2 for rotation about the second flexible portions 8, 8 as the center of rotation. The side of the head support 6 supporting the slide contact member 5 has a recess 75 facing the slide contact portion 52 of the slide contact member 5, as shown in FIGS. 1 to 3. When rotated about the second resilient flexible portions 8, 8 as the center of rotation, the slide contact member 5 is rotationally flexed so that the slide contact portion 52 is intruded into the recess 75 of the head support 6.

The one side towards the proximal end of the head support 6 positioned towards the stationary portion 3 has a connection arm 76 extending towards the stationary portion 6 as shown in FIGS. 1 to 4. The distal end of the connecting arm 76 has a weight mass 77 which is selected so that the center of gravity of the head support 6 supported by the stationary portion 3 via the first resilient flexible portions 7, 7 constituted by portions of the elastic members 2, 2 is positioned substantially in the vicinity of the resilient flexible portions 7, 7. The head support 6 is extended on one side of the resilient flexible portions 7, 7, on the other side of which is extended the connecting arm 76 provided with the weight mass 77. Thus the weight mass 77 is provided towards the stationary part 3 with respect to the first resilient flexible portions 7, 7.

In the present embodiment, the weight mass 77 is formed of the same synthetic resin material as that of the head support 6 and if formed as one with the head support 6 and the connecting arm 76. However, the weight mass 77 may also be formed of a metal material having a larger specific gravity for realizing a larger weight for smaller volume. The weight mass 77, formed of the metal material, is integrally mounted by insert molding on the connecting arm 76 formed of the synthetic resin. The weight mass 77 may also be formed by embedding the metal material of a larger specific gravity within the mass of the synthetic resin molded integrally with the connecting arm 76.

The weight mass 77 extended via the connecting arm 76 towards the opposite side to the side of the head support 6 with respect to the first resilient flexible portions 7, 7 performs the role of a rotating part for rotating the head support 6 with the first resilient flexible portions 7, 7 as the center of rotation. That is, the weight mass 77 is thrust for resiliently flexing the first resilient flexible portions 7, 7 for rotating the head support 6 about the first resilient flexible portions 7, 7 as the center of rotation.

Figure 17:
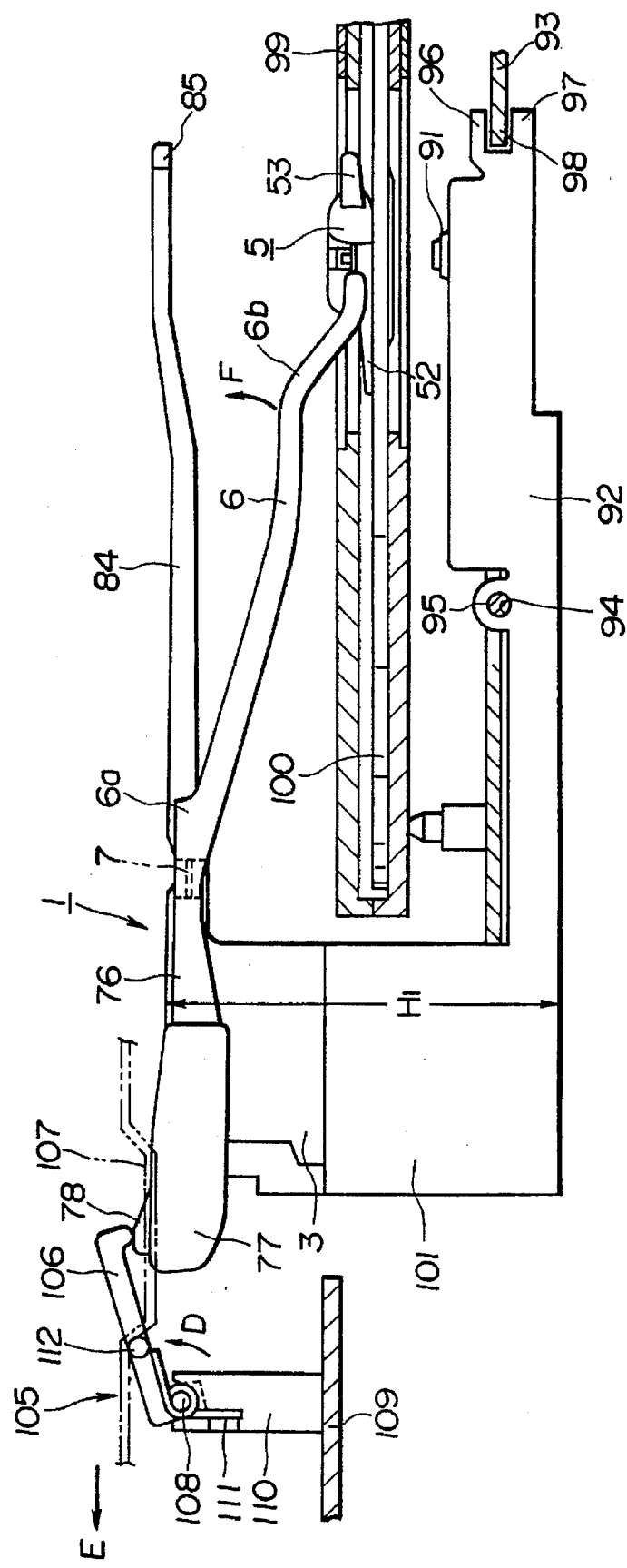
FIG. 17 is a side view showing the state in which the magnetic head device according to the present invention is mounted on the magneto-optical recording/reproducing apparatus.
Figure 18:
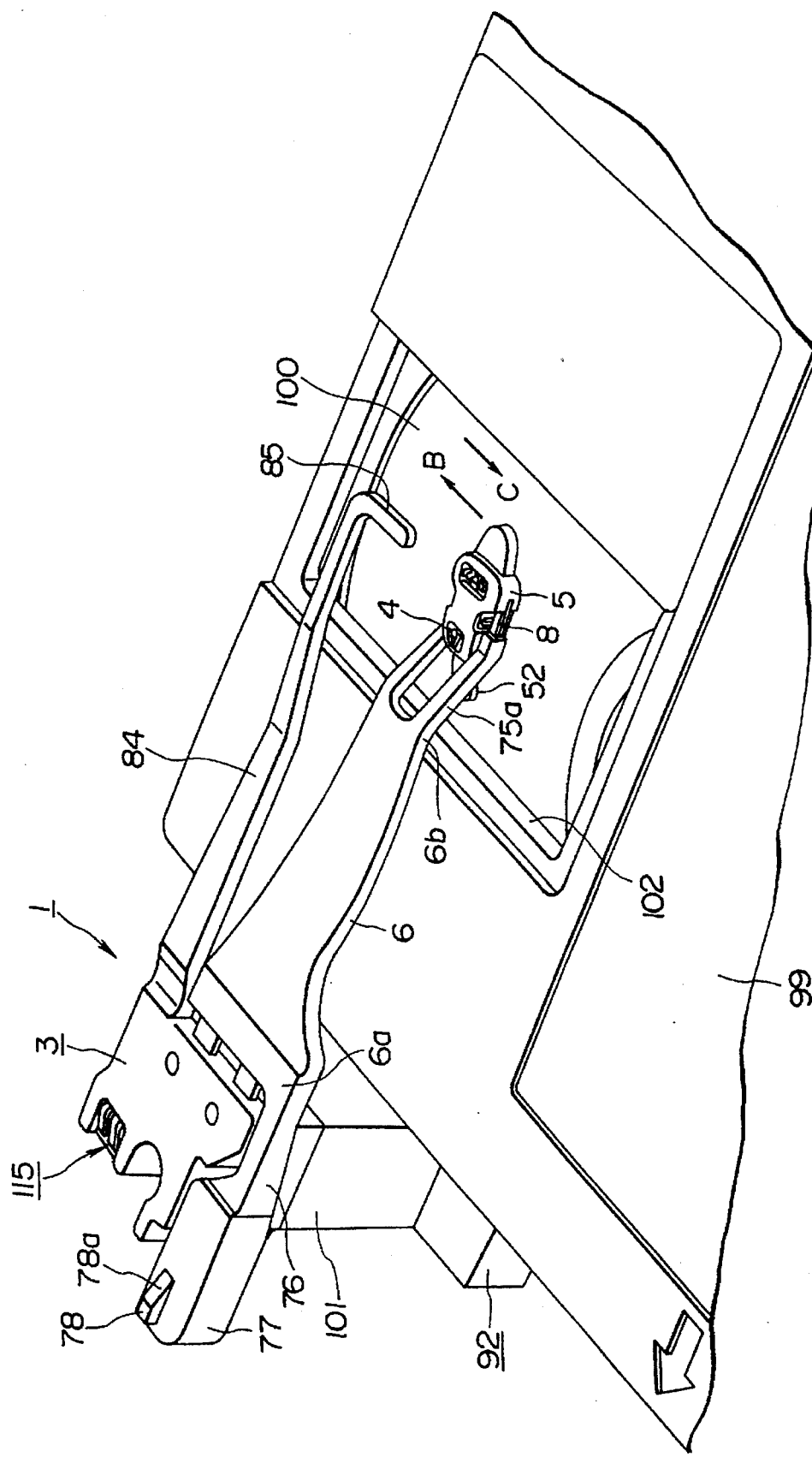
FIG. 18 is a perspective view showing the relation between the magnetic head device according to the present invention and the magneto-optical disc loaded on the magneto-optical recording/reproducing apparatus.

On the upper surface of the weight mass 77 is protuberantly formed a thrust portion 78 adapted for being thrust by a head rotating part 105 provided on the magneto-optical recording/reproducing apparatus, as shown in FIGS. 1, 17 and 18 The upper surface of the thrust portion 78 has an inclined surface 78a increased in height towards the rear side of the weight mass 77 in order that the thrust part 78 is positively thrust by the head rotating part 105 even in case the weight mass 77 is pushed down and thereby rotated about the first resilient flexible portions 7, 7 as the center of rotation.

The stationary portion 3, provided on the proximal ends of the elastic members 2, 2, is used for fixedly supporting the magnetic head device 1 on a mounting base 101 which is moved across the radius of the magneto-optical disc 1 in synchronism with the movement of the optical pickup device arranged within the magneto-optical recording/ reproducing apparatus. The stationary portion 3 has a central insertion opening 79 passed through by a securing member, such as a screw, secured to the mounting base 101, as shown in FIGS. 2, 3 and 7. The bottom side of the stationary portion 3 has an engagement opening 80 and an engagement recess 81 engaged by a pair of positioning pins, not shown, formed on the mounting base 101, as shown in FIG. 2.

On one lateral surface of the stationary portion 3 facing the weight mass 77 is mounted a rotation control portion 82 for limiting the range of rotation of the weight mass 77 when the thrust portion 78 is thrust and the weight mass 77 including the head support 6 is rotated about the first resilient flexible portions 7, 7 as the center of rotation. When the weight mass 77 is rotated, the rotation control portion 82 controls the rotation of the weight mass 77 inclusive of the head support 6 about the first resilient flexible portions 7, 7 as the center of rotation by abutment of a rotation controlling lug 83 shown in FIG. 3 against the surface of the weight mass 77 facing the stationary portion 3.

From the end of the stationary portion 3 opposite to the side thereof from which extends the connecting arm 76 carrying the wight mass 77 is provided a rotation position controlling arm 84 for extending in the direction of extension of the head support 6 substantially in parallel to the head support 6, as shown in FIGS. 1 and 3. The rotation position control arm 84 is bent at its distal end in the shape of a letter L to form a rotation position control portion 85 facing the abutment portion 53 protuberantly formed on the distal end of the slide contact member 5 as shown in FIGS. 1 and 3. The rotation position controlling arm 84 causes the rotation position controlling portion 85 to be abutted against the abutment portion 53 when the thrust portion 78 is thrust for rotating the head support 6 inclusive of the weight mass 77 about the first resilient portions 7, 7 as the center of rotation, that is when the head support 6 inclusive of the weight mass 77 is turned upwards towards the slide contact surface of the slide contact member 5 supported by the end of the head support 6 for controlling the rotating position of the slide contact member 5 turned about the second resilient flexible portions 8, 8 with respect to the head support 5.

Since the weight mass 77 is extended along a lateral side of the stationary portion 5, and the rotation position control arm 84 is extended from the opposite side of the stationary portion 5, the weight mass 77 and the rotation position control arm 84 are extended on both sides of the elastic members 2, 2, thus enabling the magnetic head device 1 to be reduced in width.

The above-described magnetic head device 1 is mounted on a movable base 92, carrying an optical pickup device 91 and movably mounted within the magneto-optical recording/reproducing apparatus, for movement in synchronism with the optical pickup device 91, as shown in FIG. 17.

The base 92, is movably supported along the radius of a magneto-optical disc 100 housed within a disc cartridge 99 loaded within the magneto-optical recording/reproducing apparatus by having a slide guide shaft 94 mounted on a chassis base plate 93 carrying mechanical components including a disc rotating mechanism being passed through a through-hole 95 formed partway in the base 92 and by supporting a slide guide shaft 98 provided at a side of the chassis base plate 93 by upper and lower engagement pieces 97, 97 formed on one end of the movable base 92. The movable base 92 is moved along the radius of the magneto-optical disc 100 via a pickup feed mechanism driven by a driving motor, not shown.

The optical pickup device 91 is mounted on the distal end of the movable base 92 so that an objective lens mounted therein for radiating a light beam from a light source to the signal recording layer of the magneto-optical disc faces the magneto-optical disc 100. The optical pickup device 91 is mounted on the movable base 92 so that the optical axis of the objective lens is positioned on the centerline of the magneto-optical disc 100.

The side of the movable base 92 opposite to the side carrying the optical pickup device 91 carries a mounting base 101 of the magnetic head device 1. The mounting base 101 is formed upright along a side of the disc cartridge 99 loaded on the cartridge loading unit within the magneto-optical disc recording/reproducing apparatus, as shown in FIG. 17. The magnetic head device 1 is mounted on the movable base 92 by having the stationary portion 3 secured to the upper end of the mounting base 101 with the head support 6 being extended over the disc cartridge 99 loaded on the cartridge loading unit, as shown in FIG. 18. That is, the magnetic head device 1 is mounted in position on the mounting base 101 by engaging the positioning pin set upright on the upper end face of the mounting base 101 in the engagement recess 81 and in the engagement opening 80 formed in the bottom surface of the stationary portion 3, and by passing a set screw through the insertion opening 79 into threaded engagement with a tapped hole, not shown, in the mounting base 101.

When the magnetic head device 1 is mounted on the mounting base 101, the center magnetic core 32a of the magnetic core 32 constituting the magnetic head element 4 mounted on the slide contact member 5 supported via second resilient flexible portions 8, 8 on the distal end of the head support 6 faces the objective lens of the optical pickup device 91, with the magneto-optical disc in-between, for applying an external magnetic field on the position of the magneto-optical disc 100 illuminated by the light beam.

As the movable base 92 is driven by the pickup feed mechanism, the magnetic head device 1, mounted on the mounting base 101, is fed in a direction along the radius of the magneto-optical disc 100 as indicated by arrows B and C in FIG. 18. The direction of movement of the magnetic head device 1 relative to the magneto-optical disc 100 is perpendicular to the longitudinal direction of the head support 6.

Since the magnetic head device 1 and the optical pickup device 91 face each other with the magneto-optical disc 100 in-between, it is necessary to provide a space between the magnetic head device 1 and the optical pickup device 91 sufficient to permit insertion and ejection of the disc cartridge 99 into and out of the cartridge loading unit, as shown in FIG. 17. Thus the stationary portion 3 of the magnetic head device 1 and the mounting base 101 are designed to have a height $H_1$ sufficient to hold a spacing to permit insertion and ejection of the disc cartridge 99.

Figure 4:
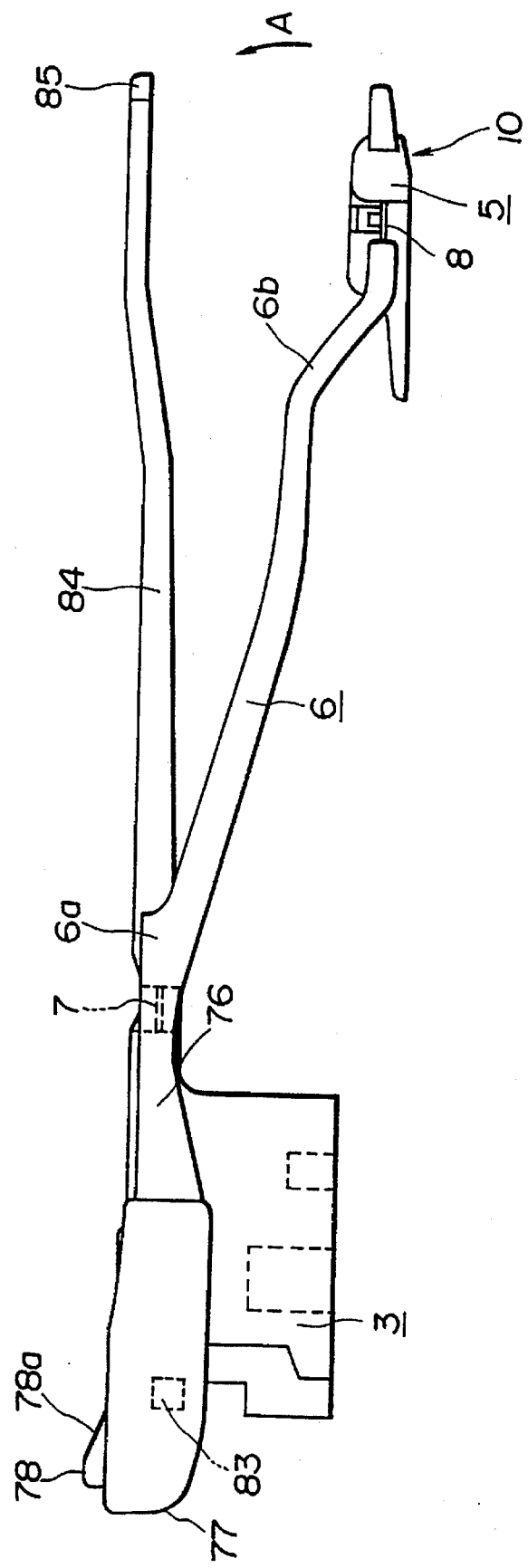
FIG. 4 is a side view showing the magnetic head device shown in FIG. 1.

The head support 6, extended from having the stationary portion 3 having the height $H_1$ for holding the spacing for insertion and ejection of the disc cartridge 99 to a position overlying the disc cartridge 99 via the first resilient flexible portions 7, 7, is inclined from its connecting portion 6a to the first resilient flexible portions 7, 7 to its distal portion carrying the slide contact member 5, for causing the slide contact member 5 supported at the distal end thereof to be slidingly contacted with the magneto-optical disc 100 loaded on the cartridge loading unit, as shown in FIGS. 1, 4 and 17. The distal end of the head support 6 carrying the slide contact member 5 is formed with a curved portion 6b which is curved further towards the magneto-optical disc 100 in order to permit the slide contact member 5 to be intruded into the disc cartridge 99 via a window 102 for the magneto-optical disc recording/reproducing apparatus formed in the disc cartridge 99. The curved portion 6b is formed by bending the proximal portions of the slide contact member supporting rms 75a, 75b extending on both lateral sides of the recess 75 formed at the distal end of the head support 6.

With the weight mass 77 not being thrust, the slide contact member 5 carried on the distal end of the head support 6 is intruded into the disc cartridge 99 into sliding contact with the magneto-optical disc 100. When the slide contact member 5 is in sliding contact with the magneto-optical disc 100, the first resilient flexible portions 7, 7 are resiliently flexed for affording a bias force biasing the head support 6 towards the magneto-optical disc 100. Thus the slide contact body 5 is slidingly contacted with the magneto-optical disc 100 with a pre-set slide contact pressure.

For loading and ejecting the disc cartridge 99, the head support 6 is turned about the first resilient flexible portion 7 for disengaging the slide contact member 5 from within the disc cartridge 99 for producing a spacing sufficient to permit loading and ejection of the disc cartridge 99 between the head support and the optical pickup device 91.

Within the magneto-optical disc recording/reproducing apparatus, in which the magnetic head device 1 is mounted, there is mounted a head rotating mechanism 105 for thrusting the thrust portion 78 of the weight mass 77 for rotating the head support 6 in a direction away from the disc cartridge 99 about the first resilient flexible portions 7, 7 as the center of rotation. The head rotating mechanism 105 has a rotating plate 106 for thrusting the thrust portion 78 of the weight mass 77 and a rotating portion 107 for rotating the rotating plate 106. The rotating plate 106 is rotatably mounted for rotation in a direction into and out of contact with the thrust portion 78 about a pivot 108 which is mounted on both sides of the proximal side of the rotary plate 106 and which is supported on a pair of supporting rods 110 set upright on a supporting base plate 109 arranged within magneto-optical disc recording/reproducing apparatus, as shown in FIG. 17. The rotating plate 106 is rotationally biased in a direction away from the thrust portion 78 as shown by arrow D in FIG. 17 by a torsion coil spring placed around the pivot shaft 108. The rotating portion 107 is provided for being protruded from a portion of a movable member horizontally moved on the magnetic head device 1 towards the rotating plate 106, so that, when the movable member is moved in the direction of arrow E in FIG. 17, the rotating portion 107 thrusts against a rotating pin 112 protuberantly formed on one side of the rotating plate 106.

The rotating plate 106 constituting the head rotating mechanism 105 is rotated about the pivot 108 in a direction opposite to that shown by arrow D in FIG. 17, against the bias of the torsion coil spring 111, by the rotating portion 107 thrusting the rotating pin 112, for thrusting the thrust portion 78 of the weight mass 77, so that the head support 6 is rotated in a direction away from the disc cartridge 99 about the first resilient flexible portions 7, 7 as the center of rotation. By rotation of the head support 6 in the direction as indicated by arrow F in FIG. 17, the slide contact member 5 is displaced away from the disc cartridge 99 for producing a spacing between the slide contact member and the optical pickup device 91 sufficient to permit insertion and ejection of the disc cartridge 99.

Any excess rotation of the head support 6 about the first resilient flexible portions 7, 7 by the head rotating mechanism 105 is controlled by abutment of the rotation controlling lug 83 against the rotation control unit 82 formed on the stationary portion 3.

Figure 19:
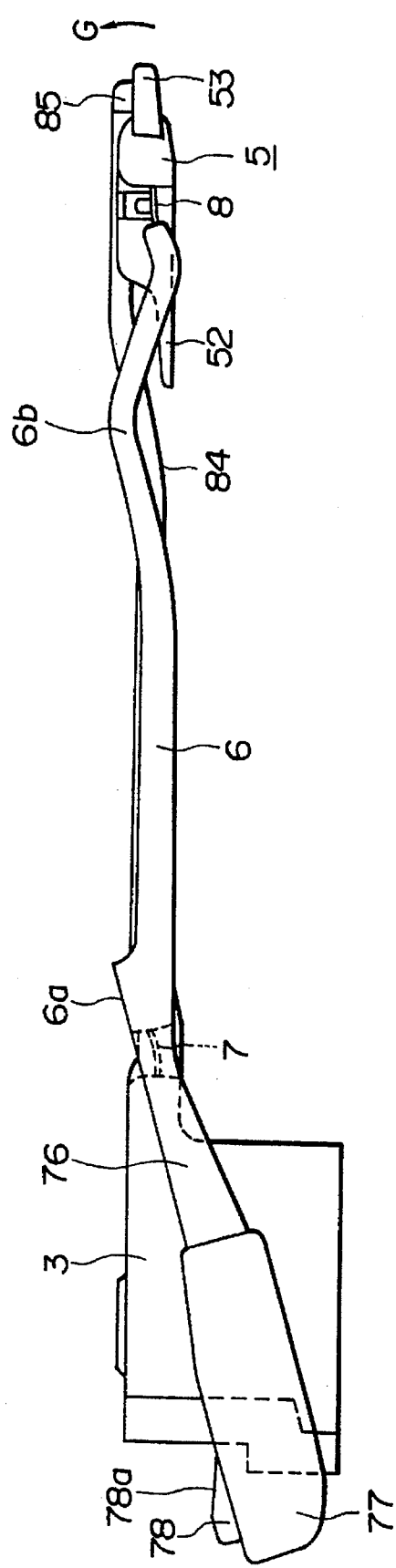
FIG. 19 is a side view showing the state in which the head support has been turned in a direction away from the magneto-optical disc.

When rotated by the head rotating mechanism 105, the head support 6 is rotated as far as a position parallel to the chassis base plate 93 within the magneto-optical disc recording/reproducing apparatus which is a position substantially parallel to the magneto-optical disc 100 loaded on the cartridge loading unit, as shown in FIG. 19. When rotated to the horizontal position, the abutment 53 formed at-the distal end of the slide contact member 5 is abutted against the rotating position control unit 85 provided at the distal end of the control arm 84, as shown in FIG. 19. At this time, the slide contact member 5 is rotated in a direction of arrow G in FIG. 19, about the second resilient pieces 8, 8 as the center of rotation, so that its position of rotation is controlled to be parallel to the head support 6. When the head support 6 is rotated, the rotating position control arm 84, controlling the rotary position so that the slide contact member 5 will be substantially parallel to the head support 6, is extended in a direction parallel to the head support 6 rotated to the horizontal position about the first resilient flexible portions 7, 7 as the center of rotation. That is, when the magnetic head device 1 is mounted in position within the magneto-optical disc recording/reproducing apparatus, the rotating position control arm 84 is extended in a horizontal position extending parallel to the chassis base plate 93.

With the present magnetic head device 1, since the head support 6 is rotated to the horizontal position parallel to the chassis base plate 93 within the magneto-optical disc recording/reproducing apparatus, which is a position substantially parallel to the magneto-optical disc 100 loaded on the cartridge loading unit, with the slide contact member 5 being then parallel to the head support 6, there may be defined a spacing sufficient to permit insertion and ejection of the disc cartridge 99 between the head support 6 and the optical pickup device 91.

Meanwhile, in the spontaneous state in which the head support 6 is not rotated about the first resilient flexible portions 7, 7, the slide contact member 5, carrying the magnetic head element 4, is mounted on the head support 6 by having its both sides in the vicinity of the center of gravity thereof supported by the second resilient flexible portions 8, 8, with the slide contact surface of the slide contact portion 52 for the magneto-optical disc lying substantially parallel to the major surface of the magneto-optical disc 100, as shown in FIGS. 4 and 17. Thus, when the head support 6 is rotated from the state in which it has been rotated about the first resilient flexible portions 7, 7 as the center of rotation towards the magneto-optical disc 100 under the force of resilient restoration of the first resilient flexible portions 7, 7, the slide contact member 5 is brought into sliding contact with the major surface of the magneto-optical disc 100 with the slide contact surface of the slide contact portion 52 being parallel to the major surface of the magneto-disc 100. In particular, since the slide contact member 5 is brought into sliding contact with the magneto-optical disc 100 in a horizontal position, a slide contact surface 56 of the slide contact portion 52 protruded from the distal end of the magnetic head element 4 may be positively brought into contact with the magneto-optical disc 100 before being contacted with the remaining portions. Thus it becomes possible to prohibit part of the magnetic head element 4 from being contacted with the disc 100 and thereby damaging the disc at the time of sliding contact of the slide contact member 5 with the magneto-optical disc.

Since both sides of the slide contact member 5 are supported in the vicinity of the center of gravity thereof by the second resilient flexible portions 8, 8, the slide contact member 5 may be brought into stable sliding contact with the rotated magneto-optical disc 100. For example, if the slide contact member 5 is wobbled about the second resilient flexible portions 8, 8 as the center due to irregularities on the major surface of the magneto-optical disc 100, the slide contact member 5 may be slidingly contacted with the magneto-optical disc 100 in a stabilized state without incurring strong vibrations. If surface deviations are incurred during rotation of the magneto-optical disc 100, the slide contact member 5 is wobbled about the second resilient flexible members 8, 8 so as to follow the surface deviations of the magneto-optical disc 100 in order to have a sliding contact with the magneto-optical disc 100 in a stabilized state without incurring unneeded vibrations.

In addition, the slide contact member 5 of the magnetic head device 1 is supported by the distal end of the head support 6 by having its both sides supported by the second resilient flexible portions 8, 8 in the vicinity of the center of gravity thereof and by having the slide contact portion 52 for the magneto-optical disc 100 located towards the stationary portion 3 which is offset towards the first resilient flexible portions 7, 7 configured for affording the force of bias to the head support 6 more significantly than towards the position of the second resilient flexible portions 8, 8.

Figure 20:
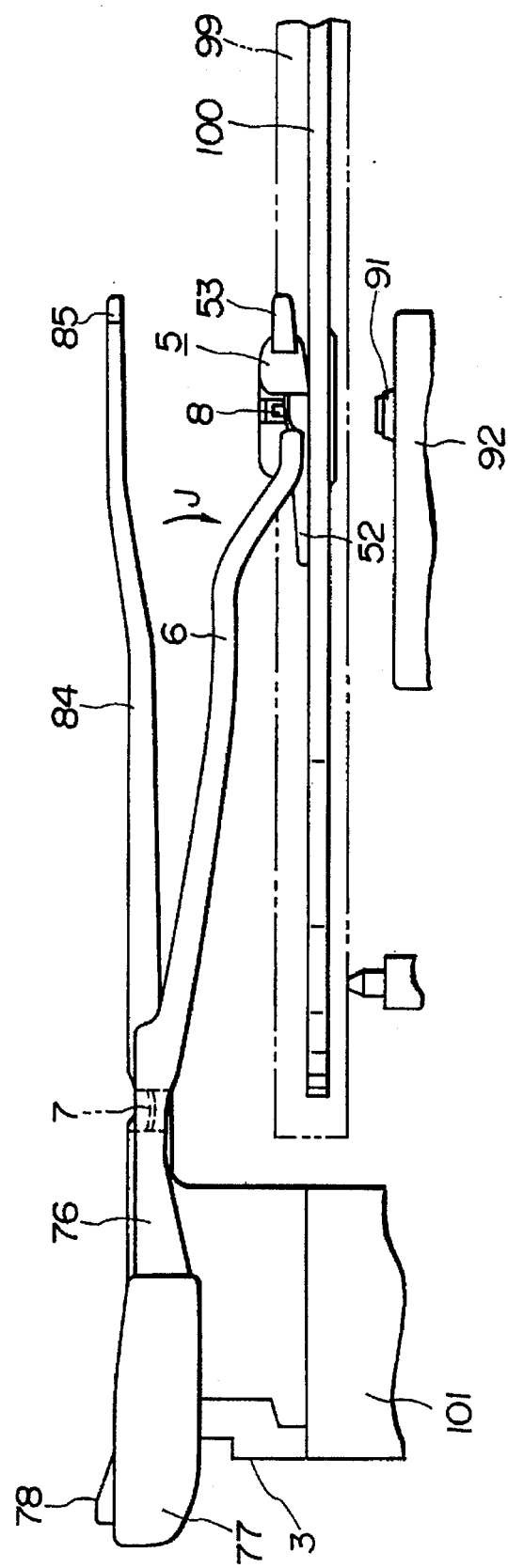
FIG. 20 is a side view showing the state in which the slide contact member has sliding contact with the magneto-optical disc.

With the above-described magnetic head device 1, the first resilient flexible portions 7, 7 supporting the head support 6 affording the force of biasing the slide contact member 5 towards the magneto-optical disc 100 are flexed for being protruded downwards towards the magneto-optical disc 100 with a pre-set force as shown in FIG. 20, whereas the second resilient flexible portions 8, 8 supporting the slide contact member 5 are bent and flexed for being protruded upwards, that is in a direction opposite to the direction of protrusion of the first resilient flexible portions 7, 7. The reason is that it is the slide contact portion 52 located more closely to the first resilient flexible portions 7, 7 than the second resilient flexible portions 8, 8 that is contacted with the magneto-optical disc 100. Since the second resilient flexible portions 8, 8 is bent and flexed so as to be protruded upwards, that is, oppositely to the direction of bending and flexing of the first resilient flexible portions 7, 7, the force of rotation biasing the slide contact portion 52 of the slide contact member 5 towards the magneto-optical disc 100 in a direction indicated by arrow J in FIG. 20 about the second resilient flexible portions 8, 8 as the center of rotation is applied to the slide contact member 5 under the force of resilient restoration of the second resilient flexible portions 8, 8. The result is that the slide contact portion 52 is positively contacted with the magneto-optical disc 100 prior to other portions of the slide contact member 5 thus realizing stable sliding contact of the slide contact member 5 with the magneto-optical disc 100.

The magnetic head device 1 mounted on the magneto-optical disc recording/reproducing apparatus is moved along the radius of the magneto-optical disc 100 with the direction of extension of the head support 6 as the movement direction, as shown in FIG. 18. The center magnetic core 32a of the magnetic core 32 of the magnetic head element 4, mounted on the mounting portion 51 provided at the center of the slide contact member 5, is positioned on the centerline of the magneto-optical disc 100. Thus, if the slide contact member 5 is moved until the center magnetic core 32a of the magnetic core 32 is positioned on the outer most periphery of the signal recording area of the magneto-optical disc 100, the slide contact portion 52 is protruded at one side thereof out of the outer periphery of the magneto-optical disc 100. For prohibiting the slide contact member 5 from being protruded from the magneto-optical disc 100 even if the slide contact member 5 has been moved up to the outer most periphery of the magneto-optical disc 100, the one side of the slide contact portion 52 is designed as an inclined portion 52b inclined along a tangential line drawn to the magneto-optical disk 100, as shown in FIGS. 9 and 11.

The inclined surface 56a and the inclined portion 52b provided on the slide contact surface 58 of the slide contact portion 52 abstruct the riding on the outer periphery of the magneto-optical disc 100, when the slide contact member 5 has been moved to the outer periphery of the disc 100, for permitting the slide contact surface 56 of the slide contact portion 52 to be slidingly contacted with the signals recording area of the magneto-optical disc 100.

Since the slide contact member 5 is slidingly contacted with the rotating magneto-optical disc 100, it is superior in sliding performance and abrasion resistance and is lightweight. In addition, it is preferably formed of a material from which high dimensional accuracy on molding can be achieved. Thus the material of the slide contact member 5 is preferably such synthetic resin materials enumerated by polyphenylene sulfide (PPS), polyacetal (POM), polyarylate (PAR), polyimide 6, polyamide 66, polyethylene terephthalate (PET), polybutylene terephthalate (PBT), ultra-high molecular weight polyethylene (UHMW-PE) or high molecular weight polyethylene (HMW-PE).

The stationary portion 3, head support 6 and the rotation position control arm 84 are formed of synthetic resin materials similar to those of the slide contact member 5. If part or all of the weight mass 77 is formed of the synthetic resin, the synthetic resin material similar to the material constituting the slide contact member 5 is employed. The materials for the stationary portion 3, head support 6, rotation position control arm 84 and the weight mass 77 are selected from among the above materials in dependence upon the characteristics required of these components.

The stationary portion 3, slide contact member 5, head support 6, rotation position control arm 84 and elastic members 2, 2 may be molded simultaneously by injecting the synthetic resin material into a cavity of a metal mold device accommodating these components by way of performing insert molding. If the stationary portion 3, slide contact member 5, head support 6, rotation position control arm 84 and the weight mass 77 are molded by separate selected materials, a two-color molding method may be employed.

Figure 21:
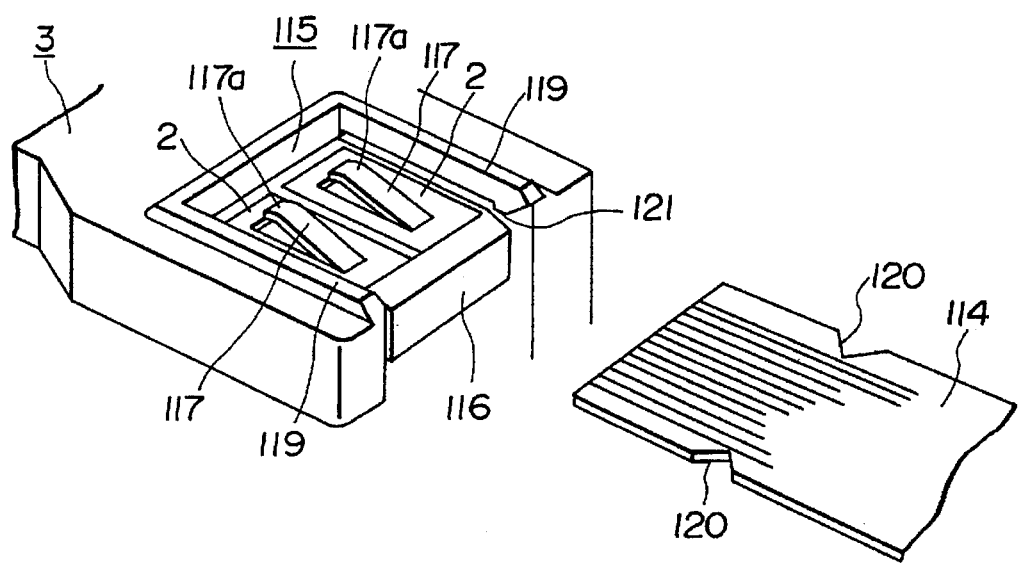
FIG. 21 is a perspective view showing a connecting portion to the external circuit provided at a stationary portion.

Referring to FIGS. 1 and 21, the stationary portion 3 is provided with an external circuit connection portion 115 connected to a connection cable 114 in the from of a flat plate, such as a flexible printed wiring board or a flexible flat cable, used for electrically connecting the magnetic head element 4 mounted on the contact slide member 5 supported on the distal end of the head support 6 to the external circuit. The external circuit connection portion 115 has a terminal supporting piece 116 protuberantly formed on the proximal end of the stationary portion 3. On a major surface of the terminal supporting piece 116 are extended terminals 117, 117 formed on the proximal ends of the elastic members 2, 2. These terminal portions 117, 117 are formed by forming substantially U-shaped tapered cut-outs in the elastic members 2, 2 electrically connected to the coil 3 of the magnetic head element 4 via feed terminals 63, 63. Thus the terminals portions 117, 117 may be resiliently flexed about the connecting portions to the elastic members 2, 2 as the fulcrum points. The terminals 117, 117 are bent so as to be protruded on the terminal support piece 116 and are formed with bends 117a. Thus the terminals 117, 117 are resiliently deflected towards the terminal support piece 116, by thrusting the bends 117a protruded on the terminal support 116, with the connecting portions to the elastic members 2, 2 as center.

The terminal support piece 116 is formed with a cut-out for permitting the distal ends of the terminals 117, 117 to be intruded therein when the terminals 117, 117 are flexed resiliently.

Figure 22:
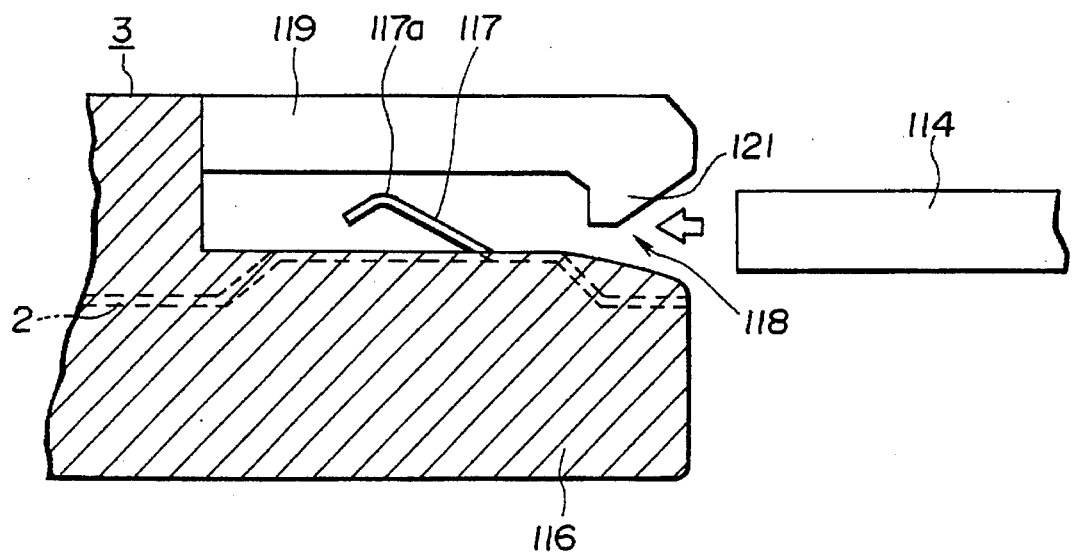
FIG. 22 is a cross-sectional view of the connecting portion to the external circuit.

Referring to FIGS. 21 and 22, on the opposing sides of the terminal supporting piece 116, there are formed a pair of connection cable supporting pieces 119, 119 forming a pair of.connection cable supporting pieces 119, 119 constituting an inserting groove 118 into which is inserted the connection cable 114 electrically connected to the terminals 117, 117 in cooperation with the terminal support pieces 116. These connection cable support pieces 119, 119 are formed for being protruded on the terminal support pieces 116 from the stationary portion 3 and delimit the insertion groove 118 in cooperation with the terminal supporting piece 116 as shown in FIGS. 21 and 22. The lower surfaces of the connection cable support pieces 119, 119 are formed with protuberant retention pawls 121 engaged in cut-outs 120 formed on both sides of the connection cable 114 inserted into the inserting groove 118, as shown in FIG. 22.

The connection cable 114 is connected to the external circuit connecting portion 115 by being inserted from its distal end first into the inserting groove 118 and by being clamped between the terminal supporting piece 116 and the connection cable supporting pieces 119, 119. The connection cable 114 is flexurally deformed at this time and pressure-contacted at the connecting pattern portion thereof against the terminal portions 117, 117 extending on the terminal supporting piece 116. By pressure contact of the connecting pattern to the terminals 117, 117, the connection cable 114 is connected to the elastic members 2, 2. The coil 33 of the magnetic head element 4 is connected via connection cable 114 and the elastic members 2, 2 to the external circuit so as to be fed with current from the external circuit.

The feed terminals 63, 63 and the terminals 117, 117 formed on the elastic members 2, 2 are plated with gold, nickel or solder. By such plating, the contact resistance of the feed terminals 63, 63 and the terminals 117, 117 is diminished and hence an optimum electrical resistance is achieved.

The upper surface of the stationary portion 3 is formed with through-holes 122, 122 for exposing portions of the elastic members 2, 2 embedded in the stationary portion to outside, as shown in FIGS. 1 and 3. The portions of the elastic members 2, 2 facing the through-holes 122, 122 operate as contact portions for an inspection tool for inspecting contact states between the elastic members 2, 2 and the coil 33 of the magnetic head element 4 or electrical characteristics of the magnetic head element 4.

The portions of the elastic members 2, 2 exposed to outside, namely the first resilient flexible portions 7, 7 and the second resilient flexible portions 8, 8, may also be plated with gold, nickel or solder for rust-proofing these exposed portions.

Although two elastic members 2, 2 are used with the above embodiments, plural pairs of the elastic members may also be used taking into account the force of resilient flexure or strength of the metal plate of the elastic members 2, 2.

What is claimed is:

1. A magnetic head device comprising:

a magnetic head element having a bobbin carrying a magnetic core and a coil;

a slide contact member carrying said magnetic head element, said slide contact member being formed of synthetic resin for having a sliding contact with a magneto-optical disc;

at least a pair of electrically conductive elastic members having a stationary portion of a synthetic resin formed integrally with second ends thereof and having said slide contact member formed integrally with first ends thereof, said elastic members being electrically connected to said coil;

a head support formed of synthetic resin integrally with said elastic members between said stationary portion and said slide contact member, said head support causing first portions of said elastic members to be exposed to the outside between it and the stationary portion for constituting first resilient flexible portions, said head support also causing second portions of said elastic members to be exposed to the outside between it and the slide contact member for constituting second resilient flexible portions; and a weight mass formed integrally with said head support on the side of said stationary portion with respect to said first resilient flexible portions.

2. The magnetic head device as claimed in claim 1 wherein said weight mass and said head support are formed integrally of synthetic resin.

3. The magnetic head device as claimed in claim 1 wherein a rotating portion for rotating said head support about the first resilient flexible portions as the center of rotation is formed integrally with said weight mass.

4. The magnetic head device as claimed in claim 3 further comprising a control portion provided in said stationary portion for controlling the amount of rotation of said rotating portion as said rotating portion is rotated and said head support is turned upwards for facing a slide contact surface of said slide contact member with respect to said magneto-optical disc.

5. The magnetic head device as claimed in claim 4 further comprising a rotating position control arm extended from said stationary portion, said rotating position control arm being abutted against an abutment portion of said slide contact member when said rotating portion is turned and said head support is turned upwards for facing a slide contact surface of the slide contact member for the magneto-optical disc about the first resilient flexible portions as the center of rotation.

6. The magnetic head device as claimed in claim 5 wherein, when the abutment portion of said slide contact member is abutted against said rotating position control arm, said rotating position control arm is substantially parallel to said head support.

7. The magnetic head device as claimed in claim 5 wherein said weight mass is extended towards one side of said elastic members and wherein said rotating position control arm is extended towards the opposite side of said elastic members.

8. The magnetic head device as claimed in claim 5 wherein said stationary portion includes an external circuit connection device formed by partially exposing the elastic members for connection to an external circuit.

9. The magnetic head device as claimed in claim 8 wherein said external circuit connection device has a support piece having exposed, extending, resiliently flexible terminal portions formed by segmenting portions of said elastic members, and connection cable support pieces formed on opposite sides of said support piece for defining an inserting groove for a flat connection cable for electrical connection with said terminal portions in cooperation with said support piece.

10. The magnetic head device as claimed in claim 9 wherein an engagement lug mating with an engagement portion formed on the connection cable is provided in said inserting groove.

11. A magnetic head device comprising:

a magnetic head element having a magnetic core and a bobbin carrying a coil;

a slide contact member carrying said magnetic head element, said slide contact member being formed of synthetic resin for having a sliding contact with a magneto-optical disc;

head supporting means having elastic means having a stationary portion of a synthetic resin formed integrally with a second end thereof and having said slide contact member integrally formed with a first end thereof, and a molding portion formed of synthetic resin integrally with said elastic means between said stationary portion and said slide contact member, said head supporting means causing portions of said elastic means to be exposed to the outside between it and the stationary portion for constituting first resilient flexible portions;

said molding portion having a weight mass formed integrally with said head supporting means so as to be closer to said stationary portion than said first resilient flexible portions.

12. The magnetic head device as claimed in claim 11 wherein said molding portion is formed by exposing portions of said elastic means between it and the slide contact member to the outside for constituting second resilient flexible portions.

13. The magnetic head device as claimed in claim 12 wherein said head supporting means is rotatably supported by said stationary portion via the first resilient flexible portions and carries said slide contact member for rotational deflection at first ends thereof via the second resilient flexible potions.

14. The magnetic head device as claimed in claim 11 wherein said elastic means is at least one pair of electrically conductive plate-shaped members electrically connected with said coil and elastically flexible in a direction towards and away from the magneto-optical disc.

15. The magnetic head device as claimed in claim 14 wherein said stationary portion has an external circuit connecting portion for connection to an external circuit by having portions of said elastic means exposed to the outside.

16. The magnetic head device as claimed in claim 11 wherein a rotating portion for rotating said head support means about the first resilient flexible portions as the center of rotation is formed integrally with said weight mass.

17. The magnetic head device as claimed in claim 16 further comprising a control portion provided in said stationary portion for controlling the mount of rotation of said rotating portion as said rotating portion is rotated and said head supporting means is turned upwards for facing a slide contact surface of said slide contact member with respect to said magneto-optical disc.

18. The magnetic head device as claimed in claim 16 further comprising a rotating position control arm extended from said stationary portion, said rotating position control arm being abutted against an abutment portion of said slide contact member when said rotating portion is mined and said head supporting means is mined upwards for facing the slide contact surface of the slide contact member with the magneto-optical disc about the first resilient flexible portions as the center of rotation.

19. A magneto-optical recording apparatus comprising:

a disc rotating mechanism for rotationally driving a magneto-optical disc loaded on the apparatus;

a movable base supported for movement radially of said magneto-optical disc;

an optical pickup device having an objective lens for radiating a beam outgoing from a light source to said magneto-optical disc, said optical pickup device being supported by said movable base for facing one of the major surfaces of said magneto-optical disc; and a magnetic head device having a slide contact member carrying a magnetic head element and having a slide contact portion slidingly contacted with said magneto-optical disc, and a head support supported for rotation relative to the movable base supported in turn for movement radially of said magneto-optical disc, said head support rotatably carrying said slide contact member for rotational deflection at first end thereof; wherein the improvement comprises:

elastic means having a stationary portion of a synthetic resin on said movable base formed integrally with second ends thereof and having said slide contact member formed integrally with first ends thereof;

said head support formed of synthetic resin integrally with said elastic means between said stationary portion and said slide contact member, said head support causing first portions of said elastic means to be exposed to the outside between it and the stationary portion for constituting first resilient flexible portions, said head support also causing second portions of said elastic means to be exposed to the outside between it and the slide contact member for constituting second resilient flexible portions; and a weight mass formed integrally with said head support so as to be closer to said stationary portion than said first resilient flexible portions.

20. The magnetic head device as claimed in claim 19 wherein said elastic means is at least one pair of electrically conductive plate-shaped members electrically connected with said coil and elastically flexible in a direction towards and away from the magneto-optical disc.

21. The magnetic head device as claimed in claim 19 wherein said weight mass and said head support are formed integrally of a synthetic resin.

22. The magnetic head device as claimed in claim 19 wherein a rotating portion for rotating said head support about the first resilient flexible portions as the center of rotation is formed integrally with said weight mass.

23. The magnetic head device as claimed in claim 22 further comprising a control portion provided in said stationary portion for controlling the mount of rotation of said rotating portion as said rotating portion is rotated and said head support is mined upwards for facing a slide contact surface of said slide contact member toward said magneto-optical disc.

24. The magnetic head device as claimed in claim 22 wherein, when said rotating portion is rotated and said head support is turned upwards for facing a slide contact surface of said slide contact member with respect to said magneto-optical disc, said head support is moved to a position enabling insertion and ejection of a disc cartridge housing a magneto-optical disc.

25. The magnetic head device as claimed in claim 22 further comprising a rotating position control arm extended from said stationary portion, said rotating position control arm being abutted against an abutment portion of said slide contact member when said rotating portion is turned and said head support is turned upwards for facing the slide contact surface of the slide contact member with the magneto-optical disc about the first resilient flexible portions as the center of rotation.

26. The magnetic head device as claimed in claim 25 wherein, when the abutment portion of said slide contact member is abutted against said rotating position control arm, said rotating position control arm is substantially parallel to said head support.

27. The magnetic head device as claimed in claim 25 wherein said weight mass is extended towards one side of said elastic means and wherein said rotating position control arm is extended towards the opposite side of said elastic means.

28. The magnetic head device as claimed in claim 19 wherein said stationary portion includes an external circuit connection device formed by partially exposing the elastic means for connection to an external circuit.

29. The magnetic head device as claimed in claim 28 wherein said external circuit connection device has a support piece having exposed, extending, resiliently flexible terminal portions formed by segmenting portions of said elastic means and connection cable support pieces formed on opposite sides of said support piece for defining an inserting groove for a flat connection cable cooperating with said support piece for being electrically connected with said terminal portions.

30. The magnetic head device as claimed in claim 29 wherein an engagement lug mating with an engagement portion formed on the connection cable is provided in said inserting groove.

* * * * *